US012776025B2

(12) United States Patent
Liang et al.

(10) Patent No.: US 12,776,025 B2
(45) Date of Patent: Oct. 27, 2026

(54) METHOD AND SYSTEM FOR ANOMALY-BASED DEFECT INSPECTION

(71) Applicant: ASML Netherlands B.V., Veldhoven (NL)

(72) Inventors: Haoyi Liang, Sunnyvale, CA (US); Yani Chen, San Jose, CA (US); Ming-Yang Yang, Milpitas, CA (US); Yang Yang, Fremont, CA (US); Xiaoxia Huang, Fremont, CA (US); Zhichao Chen, San Jose, CA (US); Liangjiang Yu, Pleasanton, CA (US); Zhe Wang, Dublin, CA (US); Lingling Pu, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 348 days.

(21) Appl. No.: 18/577,684

(22) PCT Filed: Jun. 3, 2022

(86) PCT No.: PCT/EP2022/065219
§ 371 (c)(1),
(2) Date: Jan. 8, 2024

(87) PCT Pub. No.: WO2023/280489
PCT Pub. Date: Jan. 12, 2023

(65) Prior Publication Data

US 2024/0331132 A1 Oct. 3, 2024

Related U.S. Application Data

(60) Provisional application No. 63/220,374, filed on Jul. 9, 2021.

(51) Int. Cl.
*G06T 7/00* (2017.01)
*G01N 23/2251* (2018.01)
*G06T 7/73* (2017.01)

(52) U.S. Cl.
CPC ......... *G06T 7/001* (2013.01); *G01N 23/2251* (2013.01); *G06T 7/0006* (2013.01);
(Continued)

(58) Field of Classification Search
CPC ......... G06T 7/001; G06T 7/0006; G06T 7/74; G06T 2200/24; G06T 2207/10061;
(Continued)

(56) References Cited

U.S. PATENT DOCUMENTS

2006/0291714 A1* 12/2006 Wu ...................... G03F 7/7065 382/149

FOREIGN PATENT DOCUMENTS

JP 2003083907 A 3/2003
JP 2018534758 A 11/2018
JP 2019050376 A 3/2019

OTHER PUBLICATIONS

PCT International Search Report, corresponding with a PCT Application No. PCT/EP2022/065219, mailed on Oct. 19, 2022. (2 pages).

(Continued)

*Primary Examiner* — Charlotte M Baker
(74) *Attorney, Agent, or Firm* — FINNEGAN, HENDERSON, FARABOW, GARRETT & DUNNER LLP

(57) ABSTRACT

Systems and methods for detecting a defect on a sample include receiving a first image and a second image associated with the first image; determining, using a clustering technique, N first feature descriptor(s) for L first pixel(s) in the first image and M second feature descriptor(s) for L
(Continued)

second pixel(s) in the second image, wherein each of the L first pixel(s) is co-located with one of the L second pixel(s), and L, M, and N are positive integers; determining K mapping probability between a first feature descriptor of the N first feature descriptor(s) and each of K second feature descriptor(s) of the M second feature descriptor(s), wherein K is a positive integer; and providing an output for determining whether there is existence of an abnormal pixel representing a candidate defect on the sample based on a determination that one of the K mapping probability does not exceed a threshold value.

20 Claims, 8 Drawing Sheets

(52) U.S. Cl.
CPC ........ *G06T 7/74* (2017.01); *G01N 2223/6116* (2013.01); *G06T 2200/24* (2013.01); *G06T 2207/10061* (2013.01); *G06T 2207/20081* (2013.01); *G06T 2207/30148* (2013.01)

(58) Field of Classification Search
CPC . G06T 2207/20081; G06T 2207/30148; G06T 5/40; G06T 7/30; G01N 23/2251; G01N 2223/6116; H10P 74/20; G06V 10/762
USPC .......................................................... 382/149
See application file for complete search history.

(56) References Cited

OTHER PUBLICATIONS

Carrera et al., "Defect Detection in SEM Images of Nano fibrous Materials", IEEE Transactions on Industrial Informatics, IEEE Service Center, New York, NY, US, vol. 13, No. 2, Apr. 1, 2017 (Apr. 1, 2017), pp. 551-561, [retrieved on Apr. 19, 2017].
Sprechmann et al., "Dictionary learning and sparse coding for unsupervised clustering", Acoustics Speech and Signal Processing (ICASSP), 2010 IEEE International Conference on, IEEE, Piscataway, NJ, USA, Mar. 14, 2010 (Mar. 14, 2010), pp. 2042-2045.

* cited by examiner

METHOD AND SYSTEM FOR ANOMALY-BASED DEFECT INSPECTION

CROSS-REFERENCE TO RELATED APPLICATIONS

This application claims priority to International Application No. PCT/EP2022/065219, filed 3 Jun. 2022, and published as WO 2023280489 A1, which claims priority of U.S. application 63/220,374, which was filed on 9 Jul. 2021. The contents of these applications are incorporated herein by reference in their entireties.

FIELD

The description herein relates to the field of image inspection apparatus, and more particularly to anomaly-based defect inspection.

BACKGROUND

An image inspection apparatus (e.g., a charged-particle beam apparatus or an optical beam apparatus) is able to produce a two-dimensional (2D) image of a wafer substrate by detecting particles (e.g., photons, secondary electrons, backscattered electrons, mirror electrons, or other kinds of electrons) from a surface of a wafer substrate upon impingement by a beam (e.g., a charged-particle beam or an optical beam) generated by a source associated with the inspection apparatus. Various image inspection apparatuses are used on semiconductor wafers in semiconductor industry for various purposes such as wafer processing (e.g., e-beam direct write lithography system), process monitoring (e.g., critical dimension scanning electron microscope (CD-SEM)), wafer inspection (e.g., e-beam inspection system), or defect analysis (e.g., defect review SEM, or say DR-SEM and Focused Ion Beam system, or say FIB).

To control quality of a manufactured structures on the wafer substrate, the 2D image of the wafer substrate may be analyzed to detect potential defects in the wafer substrate. Die-to-database (D2DB) inspection is a technique of defect inspection based on the 2D image, in which the image inspection apparatus may compare the 2D image with a database representation (e.g., generated based on design layouts) that corresponds to the 2D image and detect a potential defect based on the comparison. D2DB inspection is important for quality and efficiency of wafer production. As nodes on the wafer are becoming smaller and the inspection throughput is becoming faster, improvements to the D2DB inspection is inspected.

SUMMARY

Embodiments of the present disclosure provide systems and methods for detecting a defect on a sample. In some embodiments, a method for detecting a defect on a sample may include receiving, by a controller including circuitry, a first image and a second image associated with the first image. The method may also include determining, using a clustering technique, N first feature descriptor(s) for L first pixel(s) in the first image and M second feature descriptor(s) for L second pixel(s) in the second image, wherein each of the Z first pixel(s) is co-located with one of the L second pixel(s), and L, M, and N are positive integers. The method may further include determining K mapping probability between a first feature descriptor of the N first feature descriptor(s) and each of K second feature descriptor(s) of the M second feature descriptor(s), wherein K is a positive integer. The method may further include providing an output for determining whether there is existence of an abnormal pixel representing a candidate defect on the sample based on a determination that one of the K mapping probability does not exceed a threshold value.

In some embodiments, a system may include an image inspection apparatus configured to scan a sample and generate an inspection image of the sample, and a controller including circuitry. The controller may be configured for receiving a first image and a second image associated with the first image. The controller may also be configured for determining, using a clustering technique, N first feature descriptor(s) for L first pixel(s) in the first image and M second feature descriptor(s) for L second pixel(s) in the second image, wherein each of the L first pixel(s) is co-located with one of the L second pixel(s), and L, M, and N are positive integers. The controller may be further configured for determining K mapping probability between a first feature descriptor of the N first feature descriptor(s) and each of K second feature descriptor(s) of the M second feature descriptor(s), wherein K is a positive integer. The controller may be further configured for providing an output for determining whether there is existence of an abnormal pixel representing a candidate defect on the sample based on a determination that one of the K mapping probability does not exceed a threshold value.

In some embodiments, a non-transitory computer-readable medium may store a set of instructions that is executable by at least one processor of an apparatus to cause the apparatus to perform a method. The method may include receiving a first image and a second image associated with the first image. The method may also include determining, using a clustering technique, N first feature descriptor(s) for L first pixel(s) in the first image and M second feature descriptor(s) for L second pixel(s) in the second image, wherein each of the Z first pixel(s) is co-located with one of the L second pixel(s), and L. M. and N are positive integers. The method may further include determining K mapping probability between a first feature descriptor of the N first feature descriptor(s) and each of K second feature descriptor(s) of the M second feature descriptor(s), wherein K is a positive integer. The method may further include providing an output for determining whether there is existence of an abnormal pixel representing a candidate defect on the sample based on a determination that one of the K mapping probability does not exceed a threshold value.

In some embodiments, a method for detecting a defect on a sample may include receiving, by a controller including circuitry, a first image and a second image associated with the first image, the first image including a first region, and the second image including a second region. The method may also include determining, using a clustering technique, a first descriptor representing features of a plurality of pixels in the first region, and M second descriptor representing features of a plurality of co-located pixels in the second region, wherein each of the plurality of pixels is co-located with one of the plurality of co-located pixels, and M is a positive integer. The method may further include determining frequencies of a plurality of mapping relationships, wherein each of the plurality of mapping relationships associates a first pixel of the plurality of pixels in the first region and a second pixel of the plurality of co-located pixels in the second region, the first pixel is associated with the first descriptor, the second pixel is associated with one of the M second descriptor, and the first pixel is co-located with the second pixel. The method may further include providing an output for determining whether there is existence of an abnormal pixel representing a candidate defect on the sample based on a determination that a frequency of a mapping relationship associated with the abnormal pixel does not exceed a frequency threshold.

In some embodiments, a system may include an image inspection apparatus configured to scan a sample and generate an inspection image of the sample, and a controller including circuitry. The controller may be configured for receiving a first image and a second image associated with the first image, the first image including a first region, and the second image including a second region. The controller may also be configured for determining, using a clustering technique, a first descriptor representing features of a plurality of pixels in the first region, and M second descriptor representing features of a plurality of co-located pixels in the second region, wherein each of the plurality of pixels is co-located with one of the plurality of co-located pixels, and M is a positive integer. The controller may further be configured for determining frequencies of a plurality of mapping relationships, wherein each of the plurality of mapping relationships associates a first pixel of the plurality of pixels in the first region and a second pixel of the plurality of co-located pixels in the second region, the first pixel is associated with the first descriptor, the second pixel is associated with one of the M second descriptor, and the first pixel is co-located with the second pixel. The controller may further be configured for providing an output for determining whether there is existence of an abnormal pixel representing a candidate defect on the sample based on a determination that a frequency of a mapping relationship associated with the abnormal pixel does not exceed a frequency threshold.

In some embodiments, a non-transitory computer-readable medium may store a set of instructions that is executable by at least one processor of an apparatus to cause the apparatus to perform a method. The method may include receiving a first image and a second image associated with the first image, the first image including a first region, and the second image including a second region. The method may also include determining, using a clustering technique, a first descriptor representing features of a plurality of pixels in the first region, and M second descriptor representing features of a plurality of co-located pixels in the second region, wherein each of the plurality of pixels is co-located with one of the plurality of co-located pixels, and M is a positive integer. The method may further include determining frequencies of a plurality of mapping relationships, wherein each of the plurality of mapping relationships associates a first pixel of the plurality of pixels in the first region and a second pixel of the plurality of co-located pixels in the second region, the first pixel is associated with the first descriptor, the second pixel is associated with one of the M second descriptor, and the first pixel is co-located with the second pixel. The method may further include providing an output for determining whether there is existence of an abnormal pixel representing a candidate defect on the sample based on a determination that a frequency of a mapping relationship associated with the abnormal pixel does not exceed a frequency threshold.

DETAILED DESCRIPTION

Figure 1:
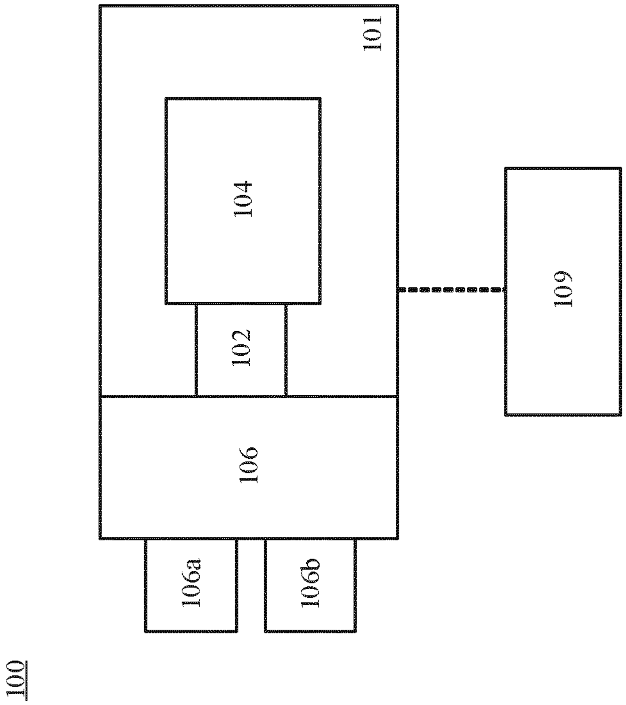
FIG. 1 is a schematic diagram illustrating an example charged-particle beam inspection (CPBI) system, consistent with some embodiments of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the subject matter recited in the appended claims. Without limiting the scope of the present disclosure, some embodiments may be described in the context of providing detection systems and detection methods in systems utilizing electron beams ("e-beams"). However, the disclosure is not so limited. Other types of charged-particle beams (e.g., including protons, ions, muons, or any other particle carrying electric charges) may be similarly applied. Furthermore, systems and methods for detection may be used in other imaging systems, such as optical imaging, photon detection, x-ray detection, ion detection, or the like.

Electronic devices are constructed of circuits formed on a piece of semiconductor material called a substrate. The semiconductor material may include, for example, silicon, gallium arsenide, indium phosphide, or silicon germanium, or the like. Many circuits may be formed together on the same piece of silicon and are called integrated circuits or ICs. The size of these circuits has decreased dramatically so that many more of them may be fit on the substrate. For example, an IC chip in a smartphone may be as small as a thumbnail and yet may include over 2 billion transistors, the size of each transistor being less than 1/1000th the size of a human hair.

Making these ICs with extremely small structures or components is a complex, time-consuming, and expensive process, often involving hundreds of individual steps. Errors in even one step have the potential to result in defects in the finished IC, rendering it useless. Thus, one goal of the manufacturing process is to avoid such defects to maximize the number of functional ICs made in the process; that is, to improve the overall yield of the process.

One component of improving yield is monitoring the chip-making process to ensure that it is producing a sufficient number of functional integrated circuits. One way to monitor the process is to inspect the chip circuit structures at various stages of their formation. Inspection may be carried out using a scanning charged-particle microscope ("SCPM"). For example, an SCPM may be a scanning electron microscope (SEM). A SCPM may be used to image these extremely small structures, in effect, taking a "picture" of the structures of the wafer. The image may be used to determine if the structure was formed properly in the proper location. If the structure is defective, then the process may be adjusted, so the defect is less likely to recur.

The working principle of a SCPM (e.g., a SEM) is similar to a camera. A camera takes a picture by receiving and recording intensity of light reflected or emitted from people or objects. An SCPM takes a "picture" by receiving and recording energies or quantities of charged particles (e.g., electrons) reflected or emitted from the structures of the wafer. Typically, the structures are made on a substrate (e.g., a silicon substrate) that is placed on a platform, referred to as a stage, for imaging. Before taking such a "picture." a charged-particle beam may be projected onto the structures, and when the charged particles are reflected or emitted ("exiting") from the structures (e.g., from the wafer surface, from the structures underneath the wafer surface, or both), a detector of the SCPM may receive and record the energies or quantities of those charged particles to generate an inspection image. To take such a "picture." the charged-particle beam may scan through the wafer (e.g., in a line-by-line or zig-zag manner), and the detector may receive exiting charged particles coming from a region under charged particle-beam projection (referred to as a "beam spot"). The detector may receive and record exiting charged particles from each beam spot one at a time and join the information recorded for all the beam spots to generate the inspection image. Some SCPMs use a single charged-particle beam (referred to as a "single-beam SCPM," such as a single-beam SEM) to take a single "picture" to generate the inspection image, while some SCPMs use multiple charged-particle beams (referred to as a "multi-beam SCPM," such as a multi-beam SEM) to take multiple "sub-pictures" of the wafer in parallel and stitch them together to generate the inspection image. By using multiple charged-particle beams, the SEM may provide more charged-particle beams onto the structures for obtaining these multiple "sub-pictures." resulting in more charged particles exiting from the structures. Accordingly, the detector may receive more exiting charged particles simultaneously and generate inspection images of the structures of the wafer with higher efficiency and faster speed.

To control quality of the manufactured structures, die-to-database (D2DB) inspection techniques may be used to detect potential defects in the structures based on comparison between the inspection image (e.g., a SEM image) and a database representation (e.g., generated based on a design layout file in a graphic database system format or "GDS" format) that corresponds to the inspection image. In some cases, D2DB inspection includes two steps. In the first step, the 2D image may be aligned with a design layout image (e.g., generated based on a GDS file). In the second step, metrology metrics, feature contours/edges, etc. between the 2D image and the GDS may be compared to identify a potential defect, and a type of the defect if so detected. Conventional D2DB inspection techniques may perform such comparison based on comparing edge information (e.g., an edge-to-edge distance) or connectivity information (e.g., vertices) extracted from both the database representation and the inspection image. For each type of defect, the conventional D2DB inspection techniques may apply a pre-defined rule to check whether a specific defect (e.g., a bridge, a broken line, a rough line, etc.) exists. However, the conventional D2DB inspection techniques may face two challenges. The first challenge may involve an error rate (also referred to as "nuisance rate") with respect to pattern recognition (e.g., edge detection or segmentation) on the inspection image (e.g., the SEM image), where the error rate may be sensitive to the image quality of the inspection image. The second challenge is that the conventional D2DB inspection technique relies on a pre-defined model for each type of defect. Such pre-defined models and parameters thereof demand a high level of human intervention (e.g., manual tuning for each type of defects) and thus provide less convenience of use. Also, the conventional D2DB inspection technique may be inapplicable for new types of defects without any corresponding pre-defined model being prepared.

Some existing D2DB inspection techniques utilize machine learning, which may compare an inspection image (e.g., the SEM image) and a simulated inspection image generated based on a design layout (e.g., a GDS file). Such machine-learning based D2DB inspection techniques may face challenges of a large nuisance rate, especially when pattern sizes in the inspection image or gray level of the inspection image change. For example, an actual inspection image may be distorted by a charging effect caused by accumulation of static electric charges on the surface of the substrate, but the machine-learning based D2DB inspection techniques may have difficulty in identifying defects when an image is distorted due to charging effects.

Embodiments of the present disclosure may provide methods, apparatuses, and systems for detecting a defect of a sample by an image inspection apparatus (e.g., a SEM). In some disclosed embodiments, a clustering technique may be applied to an inspection image of a sample and a design layout image associated with the sample. The clustering technique may generate mapping relationships between pixels of the inspection image and pixels of the design layout image. Based on the mapping relationships, it can be determined whether pixels representing the same pattern in one of the design layout image or the inspection image correspond to pixels representing similar patterns in the other of the design layout image or the inspection image. If a mapping relationship is abnormal (e.g., having a low frequency or probability of occurring), the pixels associated with such an abnormal mapping relationship may be determined to represent a potential defect. By doing so, potential defects in the sample may be determined without applying any pre-defined rule or pre-defined model relying on definition of any specific defect type. Also, the challenge of high nuisance rates in the conventional D2DB inspection techniques or the machine-learning based D2DB inspection techniques may be avoided because the disclosed embodiments do not invoke the conventional pattern recognition operations (e.g., edge detection or segmentation) on the inspection image or the conventional simulation of the inspection image based on its design layout.

Relative dimensions of components in drawings may be exaggerated for clarity. Within the following description of drawings, the same or like reference numbers refer to the same or like components or entities, and only the differences with respect to the individual embodiments are described.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A. B, or C, then, unless specifically stated otherwise or infeasible, the component may include A. or B, or C, or A and B, or A and C, or B and C, or A and B and C.

FIG. 1 illustrates an exemplary charged-particle beam inspection (CPBI) system 100 consistent with some embodiments of the present disclosure. CPBI system 100 may be used for imaging. For example. CPBI system 100 may use an electron beam for imaging. As shown in FIG. 1, CPBI system 100 includes a main chamber 101, a load/lock chamber 102, a beam tool 104, and an equipment front end module (EFEM) 106. Beam tool 104 is located within main chamber 101. EFEM 106 includes a first loading port **106*a* and a second loading port 106*b*. EFEM 106 may include additional loading port(s). First loading port 106*a* and second loading port 106*b*** receive wafer front opening unified pods (FOUPs) that contain wafers (e.g., semiconductor wafers or wafers made of other material(s)) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by beam tool 104. Beam tool 104 may be a single-beam system or a multi-beam system.

A controller 109 is electronically connected to beam tool 104. Controller 109 may be a computer configured to execute various controls of CPBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

Figure 2:
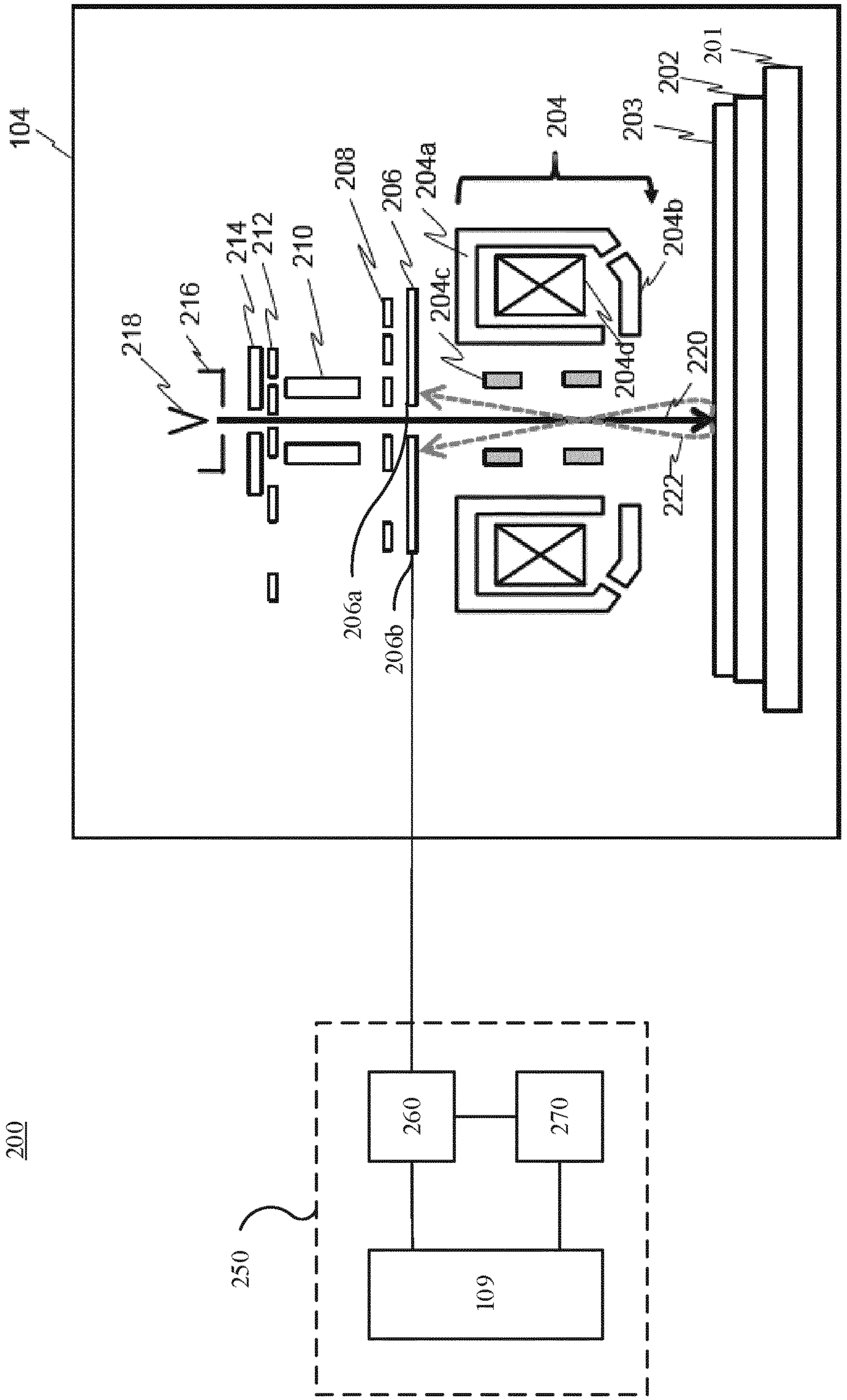
FIG. 2 is a schematic diagram illustrating an example charged-particle beam tool, consistent with some embodiments of the present disclosure that may be a part of the example charged-particle beam inspection system of FIG. 1.

FIG. 2 illustrates an example imaging system 200 according to embodiments of the present disclosure. Beam tool 104 of FIG. 2 may be configured for use in CPBI system 100. Beam tool 104 may be a single beam apparatus or a multi-beam apparatus. As shown in FIG. 2, beam tool 104 includes a motorized sample stage 201, and a wafer holder 202 supported by motorized sample stage 201 to hold a wafer 203 to be inspected. Beam tool 104 further includes an objective lens assembly 204, a charged-particle detector 206 (which includes charged-particle sensor surfaces **206*a* and 206*b*), an objective aperture 208, a condenser lens 210, a beam limit aperture 212, a gun aperture 214, an anode 216, and a cathode 218. Objective lens assembly 204, in some embodiments, may include a modified swing objective retarding immersion lens (SORIL), which includes a pole piece 204*a*, a control electrode 204*b*, a deflector 204*c*, and an exciting coil 204*d*. Beam tool 104 may additionally include an Energy Dispersive X-ray Spectrometer (EDS) detector (not shown) to characterize the materials on wafer 203**.

A primary charged-particle beam 220 (or simply "primary beam 220"), such as an electron beam, is emitted from cathode 218 by applying an acceleration voltage between anode 216 and cathode 218. Primary beam 220 passes through gun aperture 214 and beam limit aperture 212, both of which may determine the size of charged-particle beam entering condenser lens 210, which resides below beam limit aperture 212. Condenser lens 210 focuses primary beam 220 before the beam enters objective aperture 208 to set the size of the charged-particle beam before entering objective lens assembly 204. Deflector **204*c* deflects primary beam 220 to facilitate beam scanning on the wafer. For example, in a scanning process, deflector 204*c* may be controlled to deflect primary beam 220 sequentially onto different locations of top surface of wafer 203 at different time points, to provide data for image reconstruction for different parts of wafer 203. Moreover, deflector 204*c* may also be controlled to deflect primary beam 220 onto different sides of wafer 203 at a particular location, at different time points, to provide data for stereo image reconstruction of the wafer structure at that location. Further, in some embodiments, anode 216 and cathode 218 may generate multiple primary beams 220, and beam tool 104 may include a plurality of deflectors 204*c* to project the multiple primary beams 220 to different parts/sides of the wafer at the same time, to provide data for image reconstruction for different parts of wafer 203**.

Exciting coil **204*d* and pole piece 204*a* generate a magnetic field that begins at one end of pole piece 204*a* and terminates at the other end of pole piece 204*a*. A part of wafer 203 being scanned by primary beam 220 may be immersed in the magnetic field and may be electrically charged, which, in turn, creates an electric field. The electric field reduces the energy of impinging primary beam 220 near the surface of wafer 203 before it collides with wafer 203. Control electrode 204***b*, being electrically isolated from pole piece 204*a*, controls an electric field on wafer 203 to prevent micro-arching of wafer 203 and to ensure proper beam focus.

A secondary charged-particle beam 222 (or "secondary beam 222"), such as secondary electron beams, may be emitted from the part of wafer 203 upon receiving primary beam 220. Secondary beam 222 may form a beam spot on sensor surfaces 206*a* and 206*b* of charged-particle detector 206. Charged-particle detector 206 may generate a signal (e.g., a voltage, a current, or the like.) that represents an intensity of the beam spot and provide the signal to an image processing system 250. The intensity of secondary beam 222, and the resultant beam spot, may vary according to the external or internal structure of wafer 203. Moreover, as discussed above, primary beam 220 may be projected onto different locations of the top surface of the wafer or different sides of the wafer at a particular location, to generate secondary beams 222 (and the resultant beam spot) of different intensities. Therefore, by mapping the intensities of the beam spots with the locations of wafer 203, the processing system may reconstruct an image that reflects the internal or surface structures of wafer 203.

Imaging system 200 may be used for inspecting a wafer 203 on motorized sample stage 201 and includes beam tool 104, as discussed above. Imaging system 200 may also include an image processing system 250 that includes an image acquirer 260, storage 270, and controller 109. Image acquirer 260 may include one or more processors. For example, image acquirer 260 may include a computer, server, mainframe host, terminals, personal computer, any kind of mobile computing devices, and the like, or a combination thereof. Image acquirer 260 may connect with a detector 206 of beam tool 104 through a medium such as an electrical conductor, optical fiber cable, portable storage media, IR, Bluetooth, internet, wireless network, wireless radio, or a combination thereof. Image acquirer 260 may receive a signal from detector 206 and may construct an image. Image acquirer 260 may thus acquire images of wafer 203. Image acquirer 260 may also perform various post-processing functions, such as generating contours, superimposing indicators on an acquired image, and the like. Image acquirer 260 may perform adjustments of brightness and contrast, or the like. of acquired images. Storage 270 may be a storage medium such as a hard disk, cloud storage, random access memory (RAM), other types of computer readable memory, and the like. Storage 270 may be coupled with image acquirer 260 and may be used for saving scanned raw image data as original images, post-processed images, or other images assisting of the processing. Image acquirer 260 and storage 270 may be connected to controller 109. In some embodiments, image acquirer 260, storage 270, and controller 109 may be integrated together as one control unit.

In some embodiments, image acquirer 260 may acquire one or more images of a sample based on an imaging signal received from detector 206. An imaging signal may correspond to a scanning operation for conducting charged particle imaging. An acquired image may be a single image including a plurality of imaging areas. The single image may be stored in storage 270. The single image may be an original image that may be divided into a plurality of regions. Each of the regions may include one imaging area containing a feature of wafer 203.

Embodiments of this disclosure may relate to detecting a defect on a sample, including methods, systems, apparatuses, and non-transitory computer-readable media. For case of discussion, example methods are described below with the understanding that aspects of the example methods apply equally to systems, apparatuses, and non-transitory computer-readable media. For example, some aspects of such methods may be implemented by an apparatus or a system (e.g., controller 109 illustrated in FIGS. 1 and 2 or image processing system 250 illustrated in FIG. 2) or software running thereon. The apparatus or system may include at least one processor (e.g., a CPU, GPU, DSP, FPGA, ASIC, or any circuitry for performing logical operations on input data) to perform the example methods.

Consistent with some embodiments of this disclosure, a method for detecting a defect on a sample may include receiving, by a controller including circuitry, a first image and a second image associated with the first image. The first image may include a first region, and the second image may include a second region. The receiving, as used herein, may refer to accepting, taking in, admitting, gaining, acquiring, retrieving, obtaining, reading, accessing, collecting, or any operation for inputting data. The first region may be part or all of the first image, and the second region may be part or all of the second image. The first region or the second region may include a plurality of image pixels.

In some embodiments, the first image may be an inspection image generated by an image inspection apparatus (e.g., a charged-particle beam tool or an optical beam tool) that scans a sample, and the second image may be a design layout image associated with the sample. In some embodiments, the first image may be the design layout image, and the second image may be the inspection image. In some embodiments, the image inspection apparatus may include a charged-particle beam tool or an optical beam tool.

The design layout image may include integrated circuit (IC) design layout of a wafer surface portion that includes the sample under inspection. The IC design layout may be based on a pattern layout for constructing the wafer. For example, the IC design layout may correspond to one or more photolithography masks or reticles used to transfer features from the photolithography masks or reticles to a wafer. In some embodiments, the design layout image may be generated based on a data file in a graphic database system (GDS) format, a graphic database system II (GDS II) format, an open artwork system interchange standard (OASIS) format, or a Caltech intermediate format (CIF). The data file may be stored in a binary format representing feature information (e.g., planar geometric shapes, text, or any other information related to the IC design layout). For example, the data file may correspond to a design architecture to be formed on a plurality of hierarchical layers on a wafer. The design layout image may be rendered and presented based on the data file and may include characteristics information (e.g., shapes or dimensions) for various patterns on different layers that are to be formed on the wafer. For example, the data file may include information associated with various structures, devices, and systems to be fabricated on the wafer, including but not limited to, substrates, doped regions, poly-gate layers, resistance layers, dielectric layers, metal layers, transistors, processors, memories, metal connections, contacts, vias, system-on-chips (SoCs), network-on-chips (NoCs), or any other suitable structures. In some embodiments, the data file may further include IC layout design of memory blocks, logic blocks, or interconnects.

By way of example, with reference to FIGS. 1-2, the controller may be controller 109 and may receive the first image and the second image from at least one of image acquirer 260 or storage 270. For example, when the first image is the inspection image (e.g., a SEM image) and the second image is the design layout image (e.g., a GDS image), image acquirer 260 may receive the inspection image from detector 206 of beam tool 104 in a manner as described in association with FIG. 2, and controller 109 may receive the inspection image from image acquirer 260. Controller 109 may also receive the design layout image from storage 270. For example, the design layout image may be prestored in or inputted in real time to storage 270.

Consistent with some embodiments of this disclosure, the method for detecting the defect on the sample may also include determining, using a clustering technique, a first descriptor representing features of a plurality of pixels in the first region, and M (M being a positive integer, such as 1, 2, 3, or any other positive integer) second descriptor representing features of a plurality of co-located pixels in the second region. Each of the plurality of pixels in the first region may be co-located with one of the plurality of co-located pixels in the second region. Being co-located, as described herein, may refer to two objects having the same relative position in a coordinate system with the same definition of origin. For example, the first region may include a first pixel positioned at a first coordinate ($x_1$, $y_1$) with respect to a first origin (0, 0) in the first image (e.g., the first origin being a top-left corner, a top-right corner, a bottom-left corner, a bottom-right corner, a center, or any position of the first image). The second region may include a second pixel positioned at a second coordinate ($x_2$, $y_2$) with respect to a second origin (0, 0) in the second image, in which the second origin shares the same definition as the first origin. For example, the second origin may be a top-left corner of the second image if the first origin is a top-left corner of the first image, a top-right corner of the second image if the first origin is a top-right corner of the first image, a bottom-left corner of the second image if the first origin is a bottom-left corner of the first image, a bottom-right corner of the second image if the first origin is a bottom-right corner of the first image, or a center of the second image if the first origin is a center of the first image. In such cases, if $x_1$ and $x_2$ have the same value, and yy and ye have the same value, the first pixel in the first region and the second pixel in the second region may be referred to as "co-located."

In some embodiments. the plurality of pixels in the first region may be continuous or non-continuous. The plurality of co-located pixels in the first region may be continuous or non-continuous. For example, the first region may include n (n being an integer) pixels having coordinates ($x_1$, $y_1$), ($x_2$, $y_2$), . . . , ($x_n$, $y_n$), respectively. In such an example, the second region may include n co-located pixels also having coordinates ($x_1$, $y_1$), ($x_2$, $y_2$), . . . , ($x_n$, $y_n$), respectively.

In some embodiments, the clustering technique may include a dictionary learning technique. The dictionary learning technique is an unsupervised machine learning technique that may receive input data and output a set of basic features (referred to as a "dictionary") of the input data such that the input data may be represented as a linear combination (referred to as a "feature vector" or an "atom") of the set of basic features. For example, the input data may be an image, and the dictionary may be a matrix, in which each column of the matrix may represent one basic image feature. The image may be represented or reconstructed (e.g., by inverse transformation) using a linear combination of one or more columns of the matrix. In some embodiments, the dictionary learning technique may be applied to an image region by region, each region being a part of the image. In some embodiments, the dictionary learning technique may use an initial dictionary as a starting point for training. Such an initial dictionary may represent an initial guess of the output dictionary. As an example, the initial dictionary may be a set of discrete cosine transform (DCT) basis functions or discrete sine transform (DST) basis functions.

In some embodiments, the first descriptor or the M second descriptor may include data that represent the features of the plurality of pixels in the first region or the features of the plurality of co-located pixels in the second region, respectively. For example, a feature may include a feature vector or an atom (e.g., a column number of a matrix that represents the outputted dictionary) outputted by the dictionary learning technique as described herein. The feature may also include additional data, such as a size of the first region or the second region, a subset of the outputted atoms, a weight value or a multiplier, or any other information capable of reconstructing a pixel or its neighboring pixel.

By way of example, pixels in the first region may be classified into one or more classes by applying the dictionary learning technique to the first region, in which each class may be associated with a descriptor such that pixels in the same class may be reconstructed using the same descriptor. Pixels in the second region may also be classified into one or more classes by applying the dictionary learning technique to the second region, in which each class may be associated with a descriptor (e.g., the second descriptor) such that pixels in the same class may be reconstructed using the same descriptor. One of the classes of the pixels in the first region may be associated with the first descriptor and have co-located pixels in the second region. The co-located pixels in the second region may be classified into one or more classes, each of which may be associated with a second descriptor.

Figure 3:
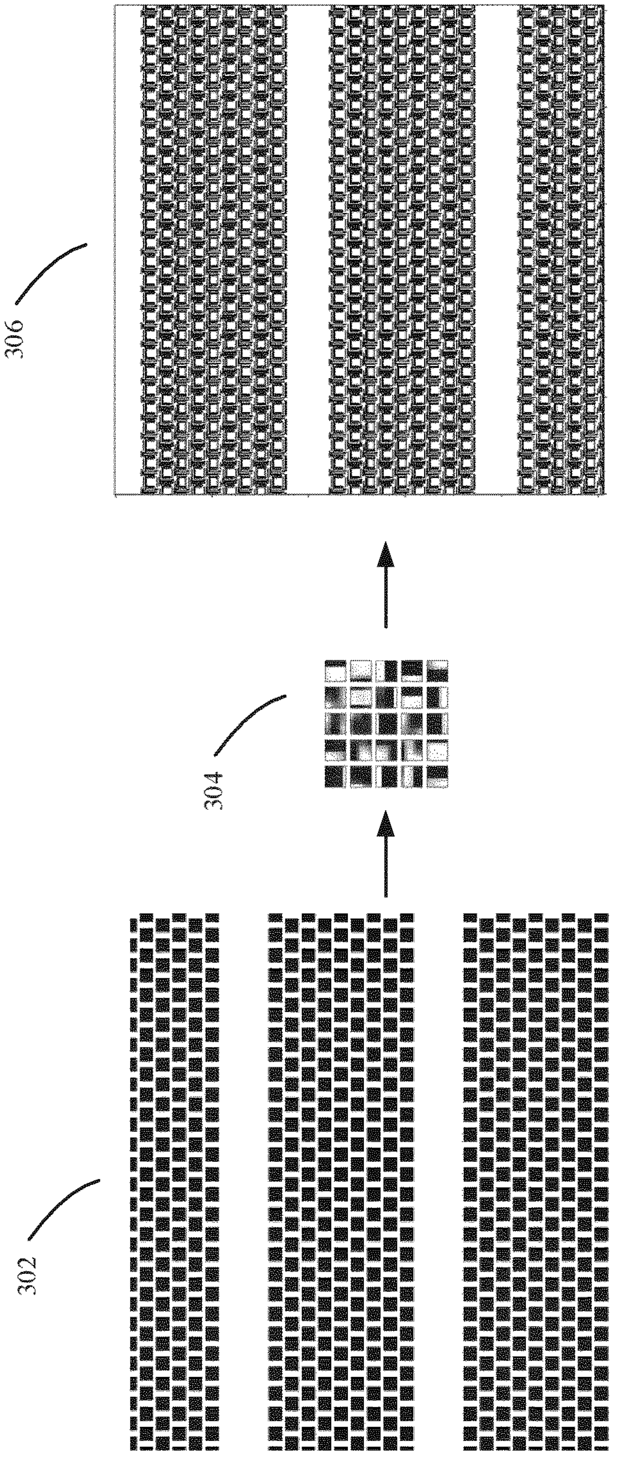
FIG. 3 is a diagram illustrating first example input and output of a dictionary learning technique, consistent with some embodiments of the present disclosure.

FIG. 3 is a diagram illustrating first example input and output of a dictionary learning technique, consistent with some embodiments of the present disclosure. As illustrated in FIG. 3, an image 302 may be inputted to a dictionary learning model (not illustrated in FIG. 3). In some embodiments, the dictionary learning model may be implemented as a set of instructions stored in a non-transitory computer-readable medium for a controller to execute. As an example, image 302 may be a design layout image (e.g., stored as a GDS image file in storage 270 in FIG. 2). The dictionary learning model may output a dictionary 304 that includes a set of image features. The dictionary learning model may also output a descriptor for each pixel in image 302. For example, the descriptor may be represented as a number (e.g., a column number of a matrix that represents dictionary 304, or an index number representing a feature vector). As illustrated in FIG. 3, the descriptors associated with all pixels in image 302 may be visualized as a descriptor map 306 (e.g., a two-dimensional image). Descriptor map 306 may have the same size and the same number of pixels as image 302. Each pixel in descriptor map 306 may represent a value indicative of the descriptor associated with its corresponding pixel in image 302. The pixels in descriptor map 306 may be color-coded (e.g., gray-coded). For example, in descriptor map 306, a brighter pixel may represent a smaller value indicative of a descriptor, and a darker pixel may represent a larger value indicative of a descriptor. It should be noted that the descriptors associated with all pixels in image 302 may be represented in forms other than numeric values and may be visualized in forms other than descriptor map 306, which are not limited in this disclosure.

Figure 4:
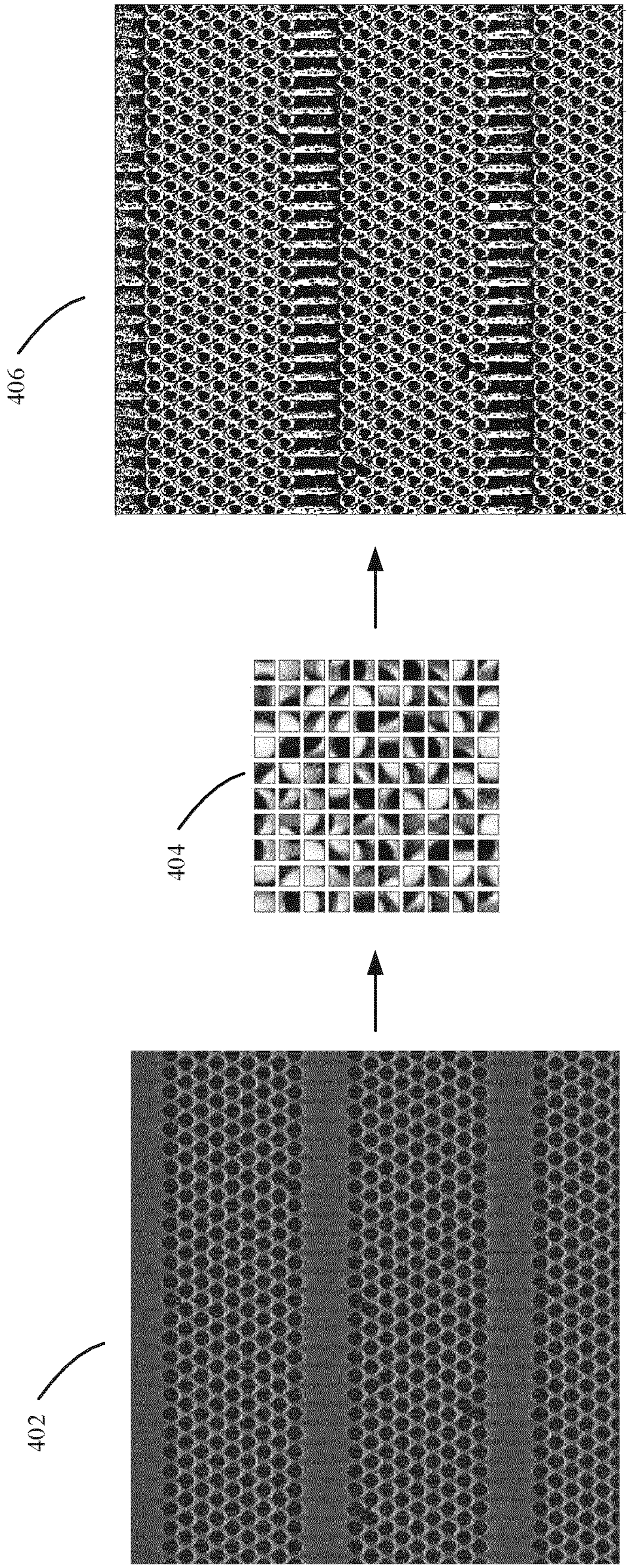
FIG. 4 is a diagram illustrating second example input and output of a dictionary learning technique, consistent with some embodiments of the present disclosure.

FIG. 4 is a diagram illustrating second example input and output of a dictionary learning technique, consistent with some embodiments of the present disclosure. As illustrated in FIG. 4, an image 402 may be inputted to a dictionary learning model (not illustrated in FIG. 4). The dictionary learning model may be the same dictionary learning model as described in association with FIG. 3. As an example, image 402 may be an inspection image generated by a charged-particle beam tool (e.g., received by image acquirer 260 from detector 206 of beam tool 104 as illustrated and described in association with FIG. 2). As another example, image 402 may be an inspection image generated by an optical beam tool (e.g., an image inspection apparatus that uses photon beams as primary beams for inspection). The dictionary learning model may output a dictionary 404 that includes a set of image features. Dictionary 404 may be different from dictionary 304 of FIG. 3. The dictionary learning model may also output a descriptor for each pixel in image 402. For example, the descriptor may be represented as a number (e.g., a column number of a matrix that represents dictionary 404, or an index number representing a feature vector). As illustrated in FIG. 4, the descriptors associated with all pixels in image 402 may be visualized as a descriptor map 406 (e.g., a two-dimensional image). Descriptor map 406 may have the same size and the same number of pixels as image 402. Each pixel in descriptor map 406 may represent a value indicative of the descriptor associated with its corresponding pixel in image 402. The pixels in descriptor map 406 may be color-coded (e.g., gray-coded). For example, in descriptor map 406, a brighter pixel may represent a smaller value indicative of a descriptor, and a darker pixel may represent a larger value indicative of a descriptor. It should be noted that the descriptors associated with all pixels in image 402 may be represented in forms other than numeric values and may be visualized in forms other than descriptor map 406, which are not limited in this disclosure.

By way of example, with reference to FIGS. 3-4, the first image may be image 302, the second image may be image 402, the first descriptor determined using the clustering technique may be a descriptor represented in descriptor map 306, and the M second descriptor determined using the clustering technique may be one or more descriptors represented in descriptor map 406. As another example, the first image may be image 402, the second image may be image 302, the first descriptor determined using the clustering technique may be a descriptor represented in descriptor map 406, and the M second descriptor determined using the clustering technique may be one or more descriptors represented in descriptor map 306.

In some embodiments, to determine the first descriptor and the M second descriptor, the method for detecting the defect on the sample may include determining data representing a first set of image features and the first descriptor by inputting the first region to the dictionary learning technique. The first descriptor may include data representing a linear combination of the first set of image features. The method may further include determining data representing a second set of image features and the M second descriptor by inputting the second region to the dictionary learning technique. Each of the M second descriptor may include data representing a linear combination of the second set of image features.

By way of example, with reference to FIGS. 3-4, the first image may be image 302, and the second image may be image 402. The data representing the first set of image features may be dictionary 304, and the data representing the second set of image features may be dictionary 404. Dictionary 304 and dictionary 404 may be represented as matrices. The first descriptor may include an atom representing a linear combination of columns of the matrix representing dictionary 304. Each of the M second descriptor may include an atom representing a linear combination of columns of the matrix representing dictionary 404.

Consistent with some embodiments of this disclosure, before determining the first descriptor and the M second descriptor, the method for detecting the defect on the sample may further include aligning the first image and the second image. For example, a first origin point of the first image and a second origin point of the second image may be designated, respectively. The first origin point and the second origin point may share the same location, such as, for example, a top-left corner, a bottom-left corner, a top-right corner, a bottom-right corner, or a center. To align the first image and the second image, the first origin and the second origin may be determined to have the same coordinate (e.g., both being set to be (0, 0)), and the orientations of the first image and the second image may be adjusted to be the same (e.g., both in a horizontal direction or a vertical direction).

Consistent with some embodiments of this disclosure, the method for detecting the defect on the sample may further include determining frequencies of a plurality of mapping relationships. Each of the plurality of mapping relationships may associate a first pixel of the plurality of pixels in the first region and a second pixel of the plurality of co-located pixels in the second region. The first pixel is co-located with the second pixel. The first pixel may be associated with the first descriptor. The second pixel may be associated with one of the M second descriptor. A mapping relationship in this disclosure may refer to a relationship that maps, links, or associates two objects. In some embodiments, the plurality of mapping relationships may map the plurality of pixels in the first region and the plurality of co-located pixels in the second region in a one-to-one manner such that each pixel of the plurality of pixels in the first region may be associated with one pixel of the plurality of co-located pixels in the second region.

In some embodiments, the plurality of pixels in the first region may be all associated with the first descriptor, and the plurality of co-located pixels in the second region associated to the plurality of pixels in the first region through the plurality of mapping relationships may be associated with one or more second descriptors. For example, the plurality of pixels in the first region may be all associated with a first descriptor represented as "A." and the M second descriptor may include descriptors represented as "B." "C." and "D." In such an example. the plurality of mapping relationships between the first descriptor and the M second descriptor may be categorized into three types: "A-B." "A-C." and "A-D." Each type of the mapping relationships may include different counts.

To determine the frequencies of the plurality of mapping relationships, in some embodiments, the counts of each type of the plurality of mapping relationships may be determined. By way of example, the first region may include n (n being an integer) pixels associated with descriptor "A." and the n pixels are co-located with n co-located pixels in the second region. The n co-located pixels in the second region may include $n_1$ ($n_1$ being an integer) co-located pixels associated with descriptor "B." $n_2$ ($n_2$ being an integer) co-located pixels associated with descriptor "C." and $n_3$ ($n_3$ being an integer) co-located pixels associated with descriptor "D." in which $n_1+n_2+n_3=n$. A frequency of a mapping relationship being of the type "A-B" may be determined as a ratio of $n_1$ over n. A frequency of a mapping relationship being of the type "A-C" may be determined as a ratio of $n_2$ over n. A frequency of a mapping relationship being of the type "A-D" may be determined as a ratio of $n_3$ over n.

Consistent with some embodiments of this disclosure, the method for detecting the defect on the sample may further include providing an output for determining whether there is existence of an abnormal pixel representing a candidate defect on the sample based on a determination that a frequency of a mapping relationship associated with the abnormal pixel does not exceed a frequency threshold (e.g., a percentage value). The abnormal pixel, as used herein, may refer to a pixel indicative of a candidate defect. The candidate defect in this disclosure may refer to an identified or determined defect by a method, an apparatus, or a system, and whether such identified or determined defect is an actual defect may be subject to further analysis. In some embodiments, besides the existence of the abnormal pixel, at least one of a location of the abnormal pixel or a type of the candidate defect may be further determined.

The abnormal pixel may be in the first region or the second region. For example, when the first image is the inspection image and the second image is the design layout image, the abnormal pixel may be in the first region. As another example, when the first image is the design layout image and the second image is the inspection image, the abnormal pixel may be in the second region.

In some embodiments, the frequency threshold may be predetermined, such as 1%, 3%, 5%, 10%, or any frequency value. The frequency threshold may be a static value. The frequency threshold may also be a value adaptable to different first images or second images. In some embodiments, the frequency threshold may be stored in a storage device (e.g., storage 270 illustrated in FIG. 2) accessible by a controller (e.g., controller 109 illustrated in FIG. 2).

By way of example, a pixel in the first region or the second region may be associated with a mapping relationship. The mapping relationship may be of a category (e.g., . . . "A-B," "A-C," or "A-D" as disclosed herein). For example. the mapping relationship may be of the type "A-D." The frequency of the "A-B" mapping relationship may be 90%. the frequency of the "A-C" mapping relationship may be 8%, and the frequency of the "A-D" mapping relationship may be 2%. If the frequency threshold is 5%. such a pixel being associated with the mapping relationship "A-D" having a frequency of 2% may be determined as the abnormal pixel. The abnormal pixel may represent that its corresponding portion of the sample may include a candidate defect (e.g., a bridge, a broken line, or a rough line).

Consistent with some embodiments of this disclosure, the method for detecting the defect on the sample may further include generating a visual representation for at least one of the frequencies of the plurality of mapping relationships, the first descriptor, or the M second descriptor. The visual representation may include at least one of a histogram representing the frequencies, a first two-dimensional map representing the frequencies at each of the plurality of pixels in the first region, a second two-dimensional map representing the frequencies at each of the plurality of co-located pixels in the second region, a third two-dimensional map representing overlay of the first region and the second two-dimensional map, or a fourth two-dimensional map representing overlay of the second region and the first two-dimensional map.

Figure 5:
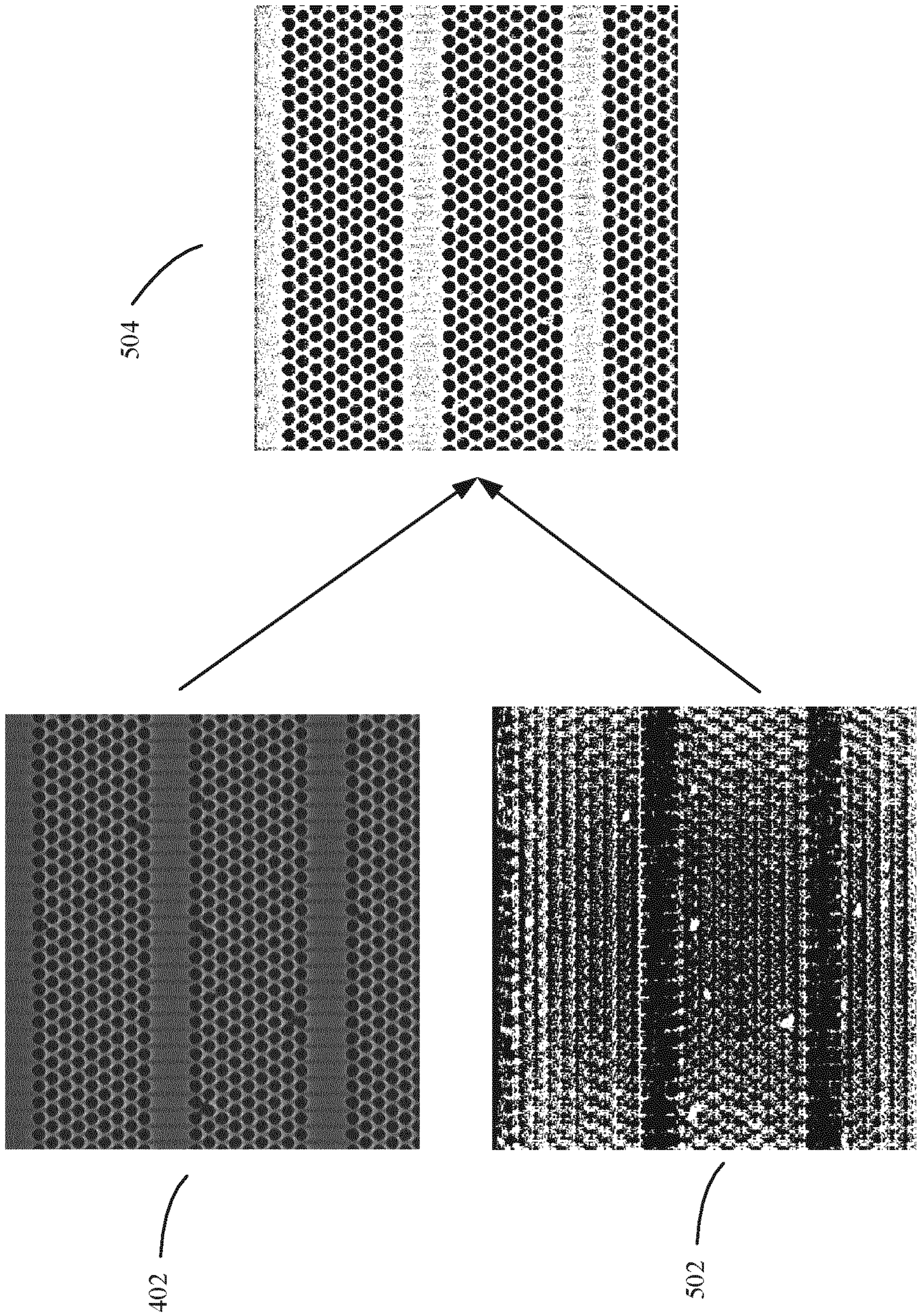
FIG. 5 is a diagram illustrating example visual representations of data related to a method for detecting the defect on a sample, consistent with some embodiments of the present disclosure.

FIG. 5 is a diagram illustrating example visual representations of data related to a method for detecting the defect on a sample, consistent with some embodiments of the present disclosure. FIG. 5 includes image 402 from FIG. 4, an anomaly map 502, and an overlay map 504. Image 402 may be an inspection image (e.g., a SEM image) of the sample. Anomaly map 502 may be a two-dimensional map generated based on descriptor map 306 in FIG. 3 and descriptor map 406 in FIG. 4. For example, descriptor map 306 and descriptor map 406 may have the same size and the same number of pixels as image 402. Each pixel in descriptor map 306 may represent a value indicative of the descriptor associated with its corresponding pixel in image 302 (e.g., a design layout image). Each pixel in descriptor map 406 may represent a value indicative of the descriptor associated with its corresponding pixel in image 402 (e.g., an inspection image). The descriptors represented by the pixels in descriptor map 306 may have mapping relationships (e.g., determined as described herein) with the descriptors represented by the pixels in descriptor map 406. Anomaly map 502 may be determined to represent the frequencies of the mapping relationships.

Each pixel in anomaly map 502 may represent a frequency value associated with a mapping relationship associated with the pixel. For example, a pixel $P_A$ in anomaly map 502 may be associated with a mapping relationship "A-C," which represents that the pixel $P_A$ is associated with a pixel $P_{D1}$ in descriptor map 306 and a pixel $P_{D2}$ in descriptor map 406. Pixel $P_{D1}$ may represent a value indicative of descriptor "A" associated with its corresponding pixel $P_1$ in image 302. Pixel $P_{D2}$ may represent a value indicative of descriptor "C" associated with its corresponding pixel $P_2$ in image 402. The mapping relationship "A-C" associated with pixel $P_A$ in anomaly map 502 may have a frequency value (e.g., 8%). Pixel $P_A$ may represent data indicative of the frequency value (e.g., 8%) in anomaly map 502. In some embodiments, pixel $P_A$ may represent the frequency value itself in anomaly map 502. In some embodiments, pixel $P_A$ may represent a transformation of the frequency value in anomaly map 502. For example, the transformation may be a subtraction (e.g., by subtracting the frequency value from 1), a multiplication (e.g., by multiplying the frequency value with −1), or a convolution (e.g., by applying a Gaussian blurring operation to pixel $P_A$). The pixels in anomaly map 502 may be color-coded (e.g., gray-coded). For example, in anomaly map 502, a brighter pixel may represent a higher probability of being abnormal (e.g., indicative of a candidate defect), and a darker pixel may represent a lower probability of being normal (e.g., not indicative of any candidate defect).

As illustrated in FIG. 5, overlay map 504 may be generated based on image 402 and anomaly map 502. By way of example, overlay map 504 may be generated by overlaying anomaly map 502 over image 402. In some embodiments, before such overlaying, image 402 may be rendered in a first color (e.g., green), and normal pixels (e.g., having frequency values below the frequency threshold) in anomaly map 502 may be rendered in the first color, and abnormal pixels (e.g., having frequency values at or above the frequency threshold) in anomaly map 502 may be rendered in a second color (e.g., red). By overlaying the color-rendered image 402 and anomaly map 502, the generated overlay map 504 may visualize candidate defects by the contrast of different colors. For example, red pixels in overlay map 504 may indicate locations of abnormal pixels, and green pixels in overlay map 504 may indicate locations of normal pixels.

Figure 6:
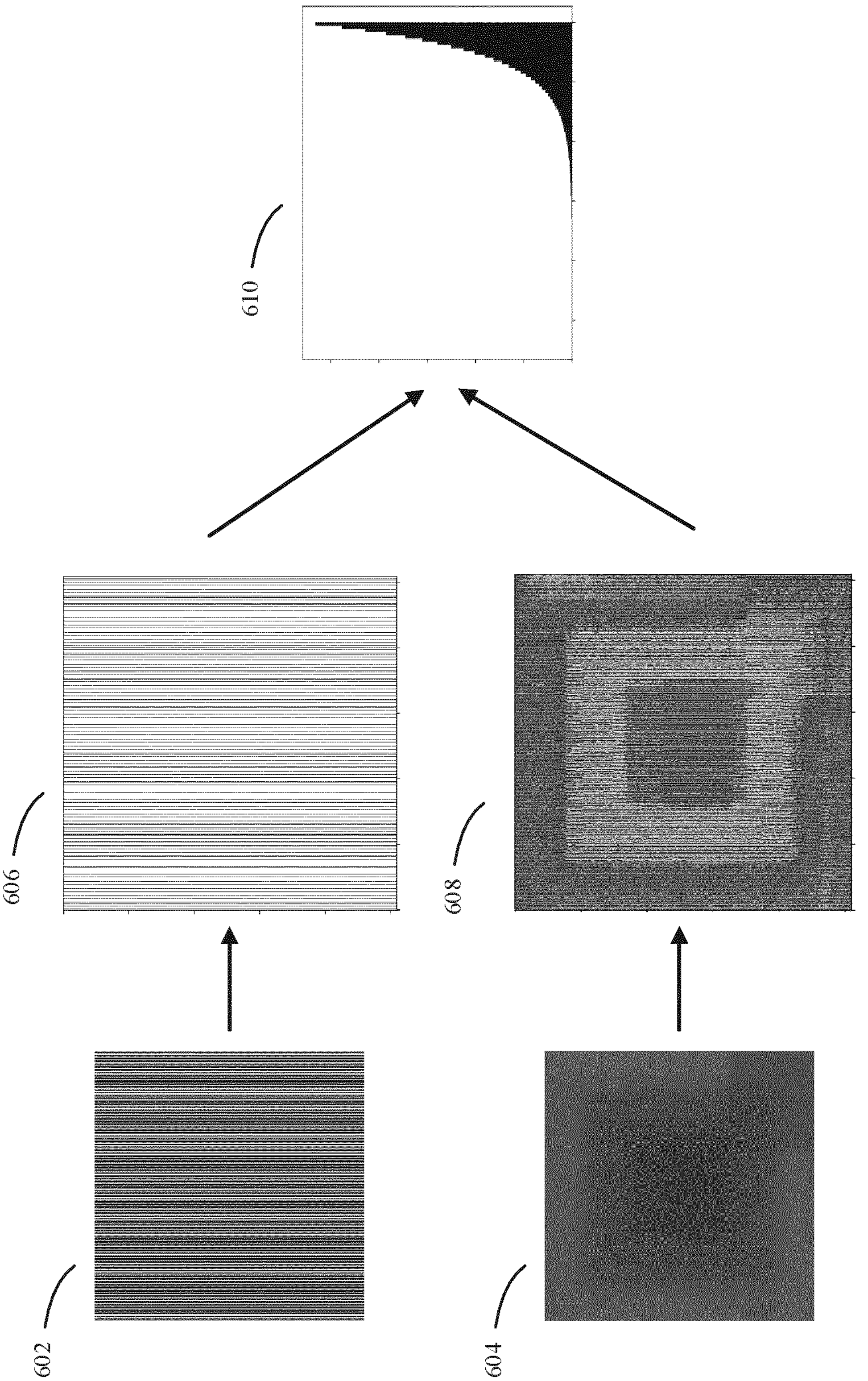
FIG. 6 is a diagram illustrating example visual representations of data related to a method for detecting the defect on a sample, consistent with some embodiments of the present disclosure.

FIG. 6 is a diagram illustrating example visual representations of data related to a method for detecting the defect on a sample, consistent with some embodiments of the present disclosure. FIG. 6 includes an image 602 (e.g., a design layout image), an image 604 (e.g., an inspection image), a descriptor map 606 generated by inputting image 602 into a clustering model (e.g., a dictionary learning model) as described herein, a descriptor map 608 generated by inputting image 604 into the clustering model, and a histogram 610. Histogram 610 may be generated based on descriptor map 606 and descriptor map 608. For example, image 602 and image 604 may have the same size and same number of pixels, and descriptor map 606 and descriptor map 608 may have the same size and the same number of pixels as image 602. Each pixel in descriptor map 606 may represent a value indicative of the descriptor associated with its corresponding pixel in image 602. Each pixel in descriptor map 608 may represent a value indicative of the descriptor associated with its corresponding pixel in image 604. The descriptors represented by the pixels in descriptor map 606 may have mapping relationships (e.g., determined as described herein) with the descriptors represented by the pixels in descriptor map 608. Each of the mapping relationships may be associated with a frequency value. Histogram 610 may be generated based on the mapping relationships and their associated frequency values.

By way of example, the x-axis of histogram 610 may represent bins of the frequency values or a transformation (e.g., logarithm) of the frequency values of the mapping relationships. The y-axis of histogram 610 may represent counts, in which the height of each bin of histogram 610 represents a count of pixels in descriptor map 606 having frequency values falling in the bin. Histogram 610 may provide visualization of an overall distribution of abnormal pixels in image 604.

Consistent with some embodiments of this disclosure, the method for detecting the defect on the sample may further include providing a user interface for configuring a parameter of the clustering technique. The parameter may include, for example, at least one of a size of the first region in the first image, a size of the second region in the second image, a count of the descriptors determined in the first region, a count of the descriptors determined in the second region, or definition data of the descriptors. In some embodiments, when the clustering technique is a dictionary learning model, the user interface may be used to configure parameters of training and applying the dictionary learning model.

Figure 7:
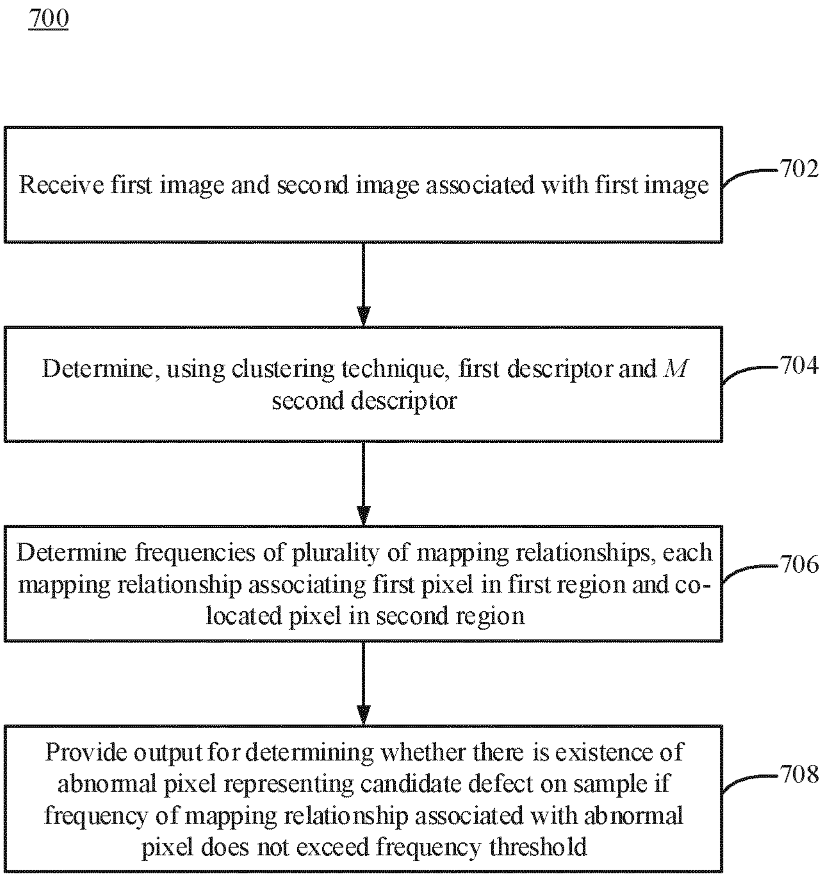
FIG. 7 is a flowchart illustrating an example method for detecting the defect on a sample, consistent with some embodiments of the present disclosure.

FIG. 7 is a flowchart illustrating an example method 700 for detecting the defect on a sample, consistent with some embodiments of the present disclosure. Method 700 may be performed by a controller that may be coupled with a charged-particle beam tool (e.g., CPBI system 100) or an optical beam tool. For example, the controller may be controller 109 in FIG. 2. The controller may be programmed to implement method 700.

At step 702, the controller may receive a first image and a second image associated with the first image. The first image may include a first region, and the second image may include a second region. In some embodiments, the first image may be an inspection image (e.g., a SEM image) generated by an image inspection apparatus scanning the sample, and the second image may be a design layout image associated with the sample. For example, the image inspection apparatus may include an optical beam tool or a charged-particle beam tool (e.g., beam tool 104 described in association with FIGS. 1-2). The design layout image may be generated based on a file in a graphic database system (GDS) format, a graphic database system II (GDS II) format, an open artwork system interchange standard (OASIS) format, or a Caltech intermediate format (CIF). In some embodiments, the first image may be a design layout image associated with the sample, and the second image may be an inspection image generated by an image inspection apparatus scanning the sample. For example, the first image and the second image may be image 302 in FIG. 3 and image 402 in FIG. 4, respectively. In another example, the first image and the second image may be image 402 in FIG. 4 and image 302 in FIG. 3, respectively.

At step 704, the controller may determine, using a clustering technique, a first descriptor representing features of a plurality of pixels in the first region, and M (M being a positive integer, such as 1, 2, 3, or any other positive integer) second descriptor representing features of a plurality of co-located pixels in the second region. Each of the plurality of pixels may be co-located with one of the plurality of co-located pixels.

In some embodiments, the clustering technique may include a dictionary learning technique. When the clustering technique is the dictionary learning technique, to determine the first descriptor and the M second descriptor, the controller may determine data (e.g., a first dictionary, such as dictionary 304 described in association with FIG. 3) representing a first set of image features and the first descriptor by inputting the first region to the dictionary learning technique. The first descriptor may include data (e.g., an atom or a feature vector) representing a linear combination of the first set of image features. The controller may also determine data (e.g., a second dictionary, such as dictionary 404 described in association with FIG. 4) representing a second set of image features and the M second descriptor by inputting the second region to the dictionary learning technique. Each of the M second descriptor may include data (e.g., an atom or a feature vector) representing a linear combination of the second set of image features.

At step 706, the controller may determine frequencies of a plurality of mapping relationships. Each of the plurality of mapping relationships may associate a first pixel of the plurality of pixels in the first region and a second pixel of the plurality of co-located pixels in the second region. The first pixel may be associated with the first descriptor. The second pixel may be associated with one of the M second descriptor. The first pixel may be co-located with the second pixel.

At step 708, the controller may provide an output for determining whether there is existence of an abnormal pixel representing a candidate defect (e.g., a bridge, a broken line, or a rough line) on the sample based on a determination that a frequency of a mapping relationship associated with the abnormal pixel does not exceed a frequency threshold (e.g., 1%, 3%, 5%, 10%, or any frequency value). The abnormal pixel may be in the first region or the second region. For example, when the first image is an inspection image and the second image is a design layout image, the abnormal pixel may be in the first region. In another example, when the first image is a design layout image and the second image is an inspection image, the abnormal pixel may be in the second region. In some embodiments, besides the existence of the abnormal pixel, at least one of a location of the abnormal pixel or a type of the candidate defect may be further determined.

Consistent with some embodiments of this disclosure, besides steps 702-708, the controller may further generate a visual representation for at least one of the frequencies of the plurality of mapping relationships, the first descriptor, or the M second descriptor. The visual representation may include at least one of a histogram (e.g., histogram 610 as described in association with FIG. 6) representing the frequencies, a first two-dimensional map (e.g., descriptor map 306 as described in association with FIG. 3) representing the frequencies at each of the plurality of pixels in the first region, a second two-dimensional map (e.g., descriptor map 406 as described in association with FIG. 4 or anomaly map 502 as described in association with FIG. 5) representing the frequencies at each of the plurality of co-located pixels in the second region, a third two-dimensional map (e.g., overlay map 504 as described in association with FIG. 5) representing overlay of the first region and the second two-dimensional map, or a fourth two-dimensional map representing overlay of the second region and the first two-dimensional map.

Consistent with some embodiments of this disclosure, before determining the first descriptor and the M second descriptor, the controller may further align the first image and the second image. Consistent with some embodiments of this disclosure, the controller may further provide a user interface for configuring a parameter of the clustering technique.

Figure 8:
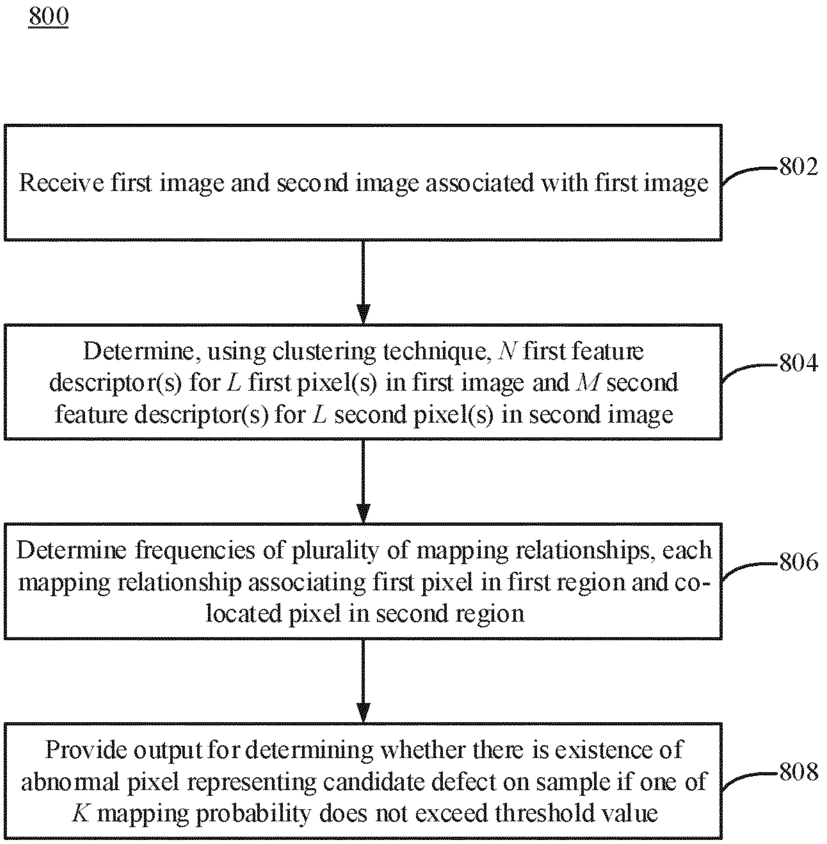
FIG. 8 is a flowchart illustrating another example method for detecting the defect on a sample, consistent with some embodiments of the present disclosure.

FIG. 8 is a flowchart illustrating an example method 800 for detecting the defect on a sample, consistent with some embodiments of the present disclosure. Method 800 may be performed by a controller that may be coupled with a charged-particle beam tool (e.g., CPBI system 100) or an optical beam tool. For example, the controller may be controller 109 in FIG. 2. The controller may be programmed to implement method 800.

At step 802, the controller may receive a first image and a second image associated with the first image. In some embodiments, the first image may be an inspection image (e.g., a SEM image) generated by an image inspection apparatus scanning the sample, and the second image may be a design layout image associated with the sample. For example, the image inspection apparatus may include an optical beam tool or a charged-particle beam tool (e.g., beam tool 104 described in association with FIGS. 1-2). The design layout image may be generated based on a file in a graphic database system (GDS) format, a graphic database system II (GDS II) format, an open artwork system interchange standard (OASIS) format, or a Caltech intermediate format (CIF). In some embodiments, the first image may be a design layout image associated with the sample, and the second image may be an inspection image generated by an image inspection apparatus scanning the sample. For example, the first image and the second image may be image 302 in FIG. 3 and image 402 in FIG. 4, respectively. In another example, the first image and the second image may be image 402 in FIG. 4 and image 302 in FIG. 3. respectively.

At step 804, the controller may determine, using a clustering technique, N (N being a positive integer, such as 1, 2, 3, or any other positive integer) first feature descriptor(s) for L (L being a positive integer, such as 1, 2, 3, or any other positive integer) first pixel(s) in the first image and M (M being a positive integer, such as 1, 2, 3, or any other positive integer) second feature descriptor(s) for L second pixel(s) in the second image. Each of the L first pixel(s) may be co-located with one of the L second pixel(s). In some embodiments, each of the N first feature descriptor(s) may represent a feature of a subset of the L first pixel(s), and each of the M second feature descriptor(s) may represent a feature of a subset of the L second pixel(s). In some embodiments, L may be greater than one, and M and N may be greater than or equal to one. In some embodiments, the clustering technique may include a dictionary learning technique.

At step 806, the controller may determine K (K being a positive integer, such as 1, 2, 3, or any other positive integer) mapping probability between a first feature descriptor of the N first feature descriptor(s) and each of K second feature descriptor(s) of the M second feature descriptor(s). In some embodiments. K may be greater than or equal to one. In some embodiments, each of the K mapping probabilities may represent a probability of mapping relationships between each pixel associated with the first feature descriptor and a pixel being co-located with the each pixel and being associated with one of the K second feature descriptor(s). The probability, as used in this disclosure, may refer to a value determined based on a frequency. For example, a probability value may be determined as a frequency value. In another example, a probability value may be determined as a value adjusted (e.g., scaled, shifted, or transformed using a function) based on a frequency value.

In some embodiments, when the clustering technique is the dictionary learning technique, to determine the K mapping probability, the controller may determine data (e.g., a first dictionary, such as dictionary 304 described in association with FIG. 3) representing a first set of image features and the N first feature descriptor(s) by inputting a first region of the first image to the dictionary learning technique. Each of the N first feature descriptor(s) may include data (e.g., an atom or a feature vector) representing a linear combination of the first set of image features. The controller may also determine data (e.g., a second dictionary, such as dictionary 404 described in association with FIG. 4) representing a second set of image features and the M second feature descriptor(s) by inputting a second region of the second image to the dictionary learning technique. Each of the M second feature descriptor(s) may include data (e.g., an atom or a feature vector) representing a linear combination of the second set of image features. Each pixel of the first region may be co-located with one pixel of the second region. The controller may further determine the K mapping probability between the first feature descriptor and each of the K second feature descriptor(s).

At step 808, the controller may provide an output for determining whether there is existence of an abnormal pixel representing a candidate defect (e.g., a bridge, a broken line, or a rough line) on the sample based on a determination that one of the K mapping probabilities does not exceed a threshold value (e.g., 1%, 3%, 5%, 10%, or any percentage value). In some embodiments, the abnormal pixel may be in the subset of the Z first pixel(s). In some embodiments, when the first image is an inspection image and the second image is a design layout image, the abnormal pixel may be in the first image. In some embodiments, when the first image is a design layout image and the second image is an inspection image, the abnormal pixel may be in the second image.

Consistent with some embodiments of this disclosure, besides steps 802-808, the controller may further generate a visual representation for at least one of the K mapping probabilities, the N first feature descriptor(s), or the M second feature descriptor(s). The visual representation may include at least one of a histogram (e.g., histogram 610 as described in association with FIG. 6) representing the K mapping probability, a first two-dimensional map (e.g., descriptor map 306 as described in association with FIG. 3) representing the K mapping probability at each of the L first pixel(s), a second two-dimensional map (e.g., descriptor map 406 as described in association with FIG. 4 or anomaly map 502 as described in association with FIG. 5) representing the K mapping probability at each of the L second pixel(s), a third two-dimensional map (e.g., overlay map 504 as described in association with FIG. 5) representing overlay of the L first pixel(s) and the second two-dimensional map, or a fourth two-dimensional map representing overlay of the L second pixel(s) and the first two-dimensional map.

Consistent with some embodiments of this disclosure, before determining the N first feature descriptor(s) and the M second feature descriptor(s), the controller may further align the first image and the second image. Consistent with some embodiments of this disclosure, the controller may further provide a user interface for configuring a parameter of the clustering technique.

A non-transitory computer readable medium may be provided that stores instructions for a processor (for example, processor of controller 109 of FIG. 1) to carry out image processing such as method 700 of FIG. 7 or method 800 of FIG. 8, data processing, database management, graphical display, operations of an image inspection apparatus or another imaging device, detecting a defect on a sample, or the like. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The embodiments may further be described using the following clauses:

1. A method for detecting a defect on a sample, the method comprising:

receiving, by a controller including circuitry, a first image and a second image associated with the first image;

determining, using a clustering technique, N first feature descriptor(s) for L first pixel(s) in the first image and M second feature descriptor(s) for L second pixel(s) in the second image, wherein each of the L first pixel(s) is co-located with one of the L second pixel(s), and L, M, and N are positive integers;

determining K mapping probability between a first feature descriptor of the N first feature descriptor(s) and each of K second feature descriptor(s) of the M second feature descriptor(s), wherein K is a positive integer; and providing an output that indicates whether there is existence of an abnormal pixel representing a candidate defect on the sample based on a determination that one of the K mapping probabilities does not exceed a threshold value.

2. The method of clause 1, wherein each of the N first feature descriptor(s) represents a feature of a subset of the L first pixel(s), and each of the M second feature descriptor(s) represents a feature of a subset of the L second pixel(s).

3. The method of clause 2, wherein the abnormal pixel is in the subset of the L first pixel(s).

4. The method of any of clauses 1-3, wherein the first image is an inspection image generated by an image inspection apparatus scanning the sample, the second image is a design layout image associated with the sample, and the abnormal pixel is in the first image.

5. The method of any of clauses 1-3, wherein the first image is a design layout image associated with the sample, the second image is an inspection image generated by an image inspection apparatus scanning the sample, and the abnormal pixel is in the second image.

6. The method of any of clauses 4-5, wherein the design layout image is generated based on a file in a graphic database system format, a graphic database system II format, an open artwork system interchange standard format, or a Caltech intermediate format.

7. The method of any of clauses 4-6, wherein the image inspection apparatus comprises a charged-particle beam tool or an optical beam tool.

8. The method of any of clauses 1-7, wherein the clustering technique comprises a dictionary learning technique.

9. The method of clause 8, wherein determining the K mapping probability comprises: determining data representing a first set of image features and the N first feature descriptor(s) by inputting a first region of the first image to the dictionary learning technique, wherein each of the N first feature descriptor(s) comprises data representing a linear combination of the first set of image features;

determining data representing a second set of image features and the M second feature descriptor(s) by inputting a second region of the second image to the dictionary learning technique, wherein each of the M second feature descriptor(s) comprises data representing a linear combination of the second set of image features, and each pixel of the first region is co-located with one pixel of the second region; and determining the K mapping probability between the first feature descriptor and each of the K second feature descriptor(s).

10. The method of any of clauses 1-9, further comprising:

generating a visual representation for at least one of the K mapping probability, the N first feature descriptor(s), or the M second feature descriptor(s), wherein the visual representation comprises at least one of a histogram representing the K mapping probability, a first two-dimensional map representing the K mapping probability at each of the L first pixel(s), a second two-dimensional map representing the K mapping probability at each of the L second pixel(s), a third two-dimensional map representing overlay of the Z first pixel(s) and the second two-dimensional map, or a fourth two-dimensional map representing overlay of the L second pixel(s) and the first two-dimensional map.

11. The method of any of clauses 1-10, wherein each of the K mapping probability represents a probability of mapping relationships between each pixel associated with the first feature descriptor and a pixel being co-located with the each pixel and being associated with one of the K second feature descriptor(s).

12. The method of any of clauses 1-11, wherein L is greater than one, and M, N, and K are greater than or equal to one.

13. The method of any of clauses 1-12, further comprising: aligning the first image and the second image before determining the N first feature descriptor(s) and the M second feature descriptor(s).

14. The method of any of clauses 1-13, further comprising: providing a user interface for configuring a parameter of the clustering technique.

15. A system, comprising:

an image inspection apparatus configured to scan a sample and generate an inspection image of the sample; and a controller including circuitry, configured for:

receiving a first image and a second image associated with the first image;

determining, using a clustering technique, N first feature descriptor(s) for L first pixel(s) in the first image and M second feature descriptor(s) for L second pixel(s) in the second image, wherein each of the Z first pixel(s) is co-located with one of the L second pixel(s), and L, M, and N are positive integers;

determining K mapping probability between a first feature descriptor of the N first feature descriptor(s) and each of K second feature descriptor(s) of the M second feature descriptor(s), wherein K is a positive integer; and providing an output that indicates whether there is existence of an abnormal pixel representing a candidate defect on the sample based on a determination that one of the K mapping probabilities does not exceed a threshold value.

16. The system of clause 15, wherein each of the N first feature descriptor(s) represents a feature of a subset of the Z first pixel(s), and each of the M second feature descriptor(s) represents a feature of a subset of the L second pixel(s).

17. The system of clause 16, wherein the abnormal pixel is in the subset of the L first pixel(s).

18. The system of any of clauses 15-17, wherein the first image is the inspection image, the second image is a design layout image associated with the sample, and the abnormal pixel is in the first image.

19. The system of any of clauses 15-17, wherein the first image is a design layout image associated with the sample, the second image is the inspection image, and the abnormal pixel is in the second image.

20. The system of any of clauses 18-19, wherein the design layout image is generated based on a file in a graphic database system format, a graphic database system II format, an open artwork system interchange standard format, or a Caltech intermediate format.

21. The system of any of clauses 15-20, wherein the clustering technique comprises a dictionary learning technique.

22. The system of clause 21, wherein determining the K mapping probability comprises: determining data representing a first set of image features and the N first feature descriptor(s) by inputting a first region of the first image to the dictionary learning technique, wherein each of the N first feature descriptor(s) comprises data representing a linear combination of the first set of image features;

determining data representing a second set of image features and the M second feature descriptor(s) by inputting a second region of the second image to the dictionary learning technique, wherein each of the M second feature descriptor(s) comprises data representing a linear combination of the second set of image features, and each pixel of the first region is co-located with one pixel of the second region; and determining the K mapping probability between the first feature descriptor and each of the K second feature descriptor(s).

23. The system of any of clauses 15-22, wherein the controller is further configured for:

generating a visual representation for at least one of the K mapping probability, the N first feature descriptor(s), or the M second feature descriptor(s), wherein the visual representation comprises at least one of a histogram representing the K mapping probability, a first two-dimensional map representing the K mapping probability at each of the Z first pixel(s), a second two-dimensional map representing the K mapping probability at each of the L second pixel(s), a third two-dimensional map representing overlay of the Z first pixel(s) and the second two-dimensional map, or a fourth two-dimensional map representing overlay of the L second pixel(s) and the first two-dimensional map.

24. The system of any of clauses 15-23, wherein each of the K mapping probability represents a probability of mapping relationships between each pixel associated with the first feature descriptor and a pixel being co-located with the each pixel and being associated with one of the K second feature descriptor(s).

25. The system of any of clauses 15-24, wherein L is greater than one, and M, N, and K are greater than or equal to one.

26. The system of any of clauses 15-25, wherein the controller is further configured for:

aligning the first image and the second image before determining the N first feature descriptor(s) and the M second feature descriptor(s).

27. The system of any of clauses 15-26, wherein the controller is further configured for:

providing a user interface for configuring a parameter of the clustering technique.

28. The system of any of clauses 15-27, wherein the image inspection apparatus comprises a charged-particle beam tool or an optical beam tool.

29. A non-transitory computer-readable medium that stores a set of instructions that is executable by at least one processor of an apparatus to cause the apparatus to perform a method, the method comprising:

receiving a first image and a second image associated with the first image;

determining, using a clustering technique, N first feature descriptor(s) for Z first pixel(s) in the first image and M second feature descriptor(s) for L second pixel(s) in the second image, wherein each of the Z first pixel(s) is co-located with one of the L second pixel(s), and L, M, and N are positive integers;

determining K mapping probability between a first feature descriptor of the N first feature descriptor(s) and each of K second feature descriptor(s) of the M second feature descriptor(s), wherein K is a positive integer; and providing an output that indicates whether there is existence of an abnormal pixel representing a candidate defect on the sample based on a determination that one of the K mapping probabilities does not exceed a threshold value.

30. The non-transitory computer-readable medium of clause 29, wherein each of the N first feature descriptor(s) represents a feature of a subset of the L first pixel(s), and each of the M second feature descriptor(s) represents a feature of a subset of the L second pixel(s).

31. The non-transitory computer-readable medium of clause 30, wherein the abnormal pixel is in the subset of the L first pixel(s).

32. The non-transitory computer-readable medium of any of clauses 29-31, wherein the first image is an inspection image generated by an image inspection apparatus scanning the sample, the second image is a design layout image associated with the sample, and the abnormal pixel is in the first image.

33. The non-transitory computer-readable medium of any of clauses 29-31, wherein the first image is a design layout image associated with the sample, the second image is an inspection image generated by an image inspection apparatus scanning the sample, and the abnormal pixel is in the second image.

34. The non-transitory computer-readable medium of any of clauses 32-33, wherein the design layout image is generated based on a file in a graphic database system format, a graphic database system II format, an open artwork system interchange standard format, or a Caltech intermediate format.

35. The non-transitory computer-readable medium of any of clauses 32-34, wherein the image inspection apparatus comprises a charged-particle beam tool or an optical beam tool.

36. The non-transitory computer-readable medium of any of clauses 29-35, wherein the clustering technique comprises a dictionary learning technique.

37. The non-transitory computer-readable medium of clause 36, wherein determining the K mapping probability comprises:

determining data representing a first set of image features and the N first feature descriptor(s) by inputting a first region of the first image to the dictionary learning technique, wherein each of the N first feature descriptor(s) comprises data representing a linear combination of the first set of image features;

determining data representing a second set of image features and the M second feature descriptor(s) by inputting a second region of the second image to the dictionary learning technique, wherein each of the M second feature descriptor(s) comprises data representing a linear combination of the second set of image features, and each pixel of the first region is co-located with one pixel of the second region; and determining the K mapping probability between the first feature descriptor and each of the K second feature descriptor(s).

38. The non-transitory computer-readable medium of any of clauses 29-37, wherein the method further comprises:

generating a visual representation for at least one of the K mapping probability, the N first feature descriptor(s), or the M second feature descriptor(s), wherein the visual representation comprises at least one of a histogram representing the K mapping probability, a first two-dimensional map representing the K mapping probability at each of the Z first pixel(s), a second two-dimensional map representing the K mapping probability at each of the L second pixel(s), a third two-dimensional map representing overlay of the L first pixel(s) and the second two-dimensional map, or a fourth two-dimensional map representing overlay of the L second pixel(s) and the first two-dimensional map.

39. The non-transitory computer-readable medium of any of clauses 29-38, wherein each of the K mapping probability represents a probability of mapping relationships between each pixel associated with the first feature descriptor and a pixel being co-located with the each pixel and being associated with one of the K second feature descriptor(s).

40. The non-transitory computer-readable medium of any of clauses 29-39, wherein L is greater than one, and M, N, and K are greater than or equal to one.

41. The non-transitory computer-readable medium of any of clauses 29-40, wherein the method further comprises:

aligning the first image and the second image before determining the N first feature descriptor(s) and the M second feature descriptor(s).

42. The non-transitory computer-readable medium of any of clauses 29-41, wherein the method further comprises:

providing a user interface for configuring a parameter of the clustering technique.

43. A method for detecting a defect on a sample, the method comprising:

receiving, by a controller including circuitry, a first image and a second image associated with the first image, the first image comprising a first region, and the second image comprising a second region;

determining, using a clustering technique, a first descriptor representing features of a plurality of pixels in the first region, and M second descriptor representing features of a plurality of co-located pixels in the second region, wherein each of the plurality of pixels is co-located with one of the plurality of co-located pixels, and M is a positive integer;

determining frequencies of a plurality of mapping relationships, wherein each of the plurality of mapping relationships associates a first pixel of the plurality of pixels in the first region and a second pixel of the plurality of co-located pixels in the second region, the first pixel is associated with the first descriptor, the second pixel is associated with one of the M second descriptor, and the first pixel is co-located with the second pixel; and providing an output for determining whether there is existence of an abnormal pixel representing a candidate defect on the sample based on a determination that a frequency of a mapping relationship associated with the abnormal pixel does not exceed a frequency threshold.

44. The method of clause 43, wherein the first image is an inspection image generated by an image inspection apparatus scanning the sample, the second image is a design layout image associated with the sample, and the abnormal pixel is in the first region.

45. The method of clause 43, wherein the first image is a design layout image associated with the sample, the second image is an inspection image generated by an image inspection apparatus scanning the sample, and the abnormal pixel is in the second region.

46. The method of any of clauses 44-45, wherein the design layout image is generated based on a file in a graphic database system format, a graphic database system II format, an open artwork system interchange standard format, or a Caltech intermediate format.

47. The method of any of clauses 44-46, wherein the image inspection apparatus comprises a charged-particle beam tool or an optical beam tool.

48. The method of any of clauses 43-47, wherein the clustering technique comprises a dictionary learning technique.

49. The method of clause 48, wherein determining the first descriptor and the M second descriptor comprises:

determining data representing a first set of image features and the first descriptor by inputting the first region to the dictionary learning technique, wherein the first descriptor comprises data representing a linear combination of the first set of image features; and determining data representing a second set of image features and the M second descriptor by inputting the second region to the dictionary learning technique, wherein each of the M second descriptor comprises data representing a linear combination of the second set of image features.

50. The method of any of clauses 43-49, further comprising:

generating a visual representation for at least one of the frequencies of the plurality of mapping relationships, the first descriptor, or the M second descriptor, wherein the visual representation comprises at least one of a histogram representing the frequencies, a first two-dimensional map representing the frequencies at each of the plurality of pixels in the first region, a second two-dimensional map representing the frequencies at each of the plurality of co-located pixels in the second region, a third two-dimensional map representing overlay of the first region and the second two-dimensional map, or a fourth two-dimensional map representing overlay of the second region and the first two-dimensional map.

51. The method of any of clauses 43-50, further comprising:

aligning the first image and the second image before determining the first descriptor and the M second descriptor.

52. The method of any of clauses 43-51, further comprising:

providing a user interface for configuring a parameter of the clustering technique.

53. A system, comprising:

a scanning charged-particle apparatus configured to scan a sample and generate an inspection image of the sample; and a controller including circuitry, configured for:

receiving a first image and a second image associated with the first image, the first image comprising a first region, and the second image comprising a second region;

determining, using a clustering technique, a first descriptor representing features of a plurality of pixels in the first region, and M second descriptor representing features of a plurality of co-located pixels in the second region, wherein each of the plurality of pixels is co-located with one of the plurality of co-located pixels, and M is a positive integer;

determining frequencies of a plurality of mapping relationships, wherein each of the plurality of mapping relationships associates a first pixel of the plurality of pixels in the first region and a second pixel of the plurality of co-located pixels in the second region, the first pixel is associated with the first descriptor, the second pixel is associated with one of the M second descriptor, and the first pixel is co-located with the second pixel; and providing an output for determining whether there is existence of an abnormal pixel representing a candidate defect on the sample based on a determination that a frequency of a mapping relationship associated with the abnormal pixel does not exceed a frequency threshold.

54. The system of clause 53, wherein the first image is the inspection image, the second image is a design layout image associated with the sample, and the abnormal pixel is in the first region.

55. The system of clause 53, wherein the first image is a design layout image associated with the sample, the second image is the inspection image, and the abnormal pixel is in the second region.

56. The system of any of clauses 54-55, wherein the design layout image is generated based on a file in a graphic database system format, a graphic database system II format, an open artwork system interchange standard format, or a Caltech intermediate format.

57. The system of any of clauses 54-56, wherein the image inspection apparatus comprises a charged-particle beam tool or an optical beam tool.

58. The system of any of clauses 53-57, wherein the clustering technique comprises a dictionary learning technique.

59. The system of clause 58, wherein determining the first descriptor and the M second descriptor comprises:

determining data representing a first set of image features and the first descriptor by inputting the first region to the dictionary learning technique, wherein the first descriptor comprises data representing a linear combination of the first set of image features; and determining data representing a second set of image features and the M second descriptor by inputting the second region to the dictionary learning technique, wherein each of the M second descriptor comprises data representing a linear combination of the second set of image features.

60. The system of any of clauses 53-59, wherein the controller is further configured for:

generating a visual representation for at least one of the frequencies of the plurality of mapping relationships, the first descriptor, or the M second descriptor, wherein the visual representation comprises at least one of a histogram representing the frequencies, a first two-dimensional map representing the frequencies at each of the plurality of pixels in the first region, a second two-dimensional map representing the frequencies at each of the plurality of co-located pixels in the second region, a third two-dimensional map representing overlay of the first region and the second two-dimensional map, or a fourth two-dimensional map representing overlay of the second region and the first two-dimensional map.

61. The system of any of clauses 53-60, wherein the controller is further configured for:

aligning the first image and the second image before determining the first descriptor and the M second descriptor.

62. The system of any of clauses 53-61, wherein the controller is further configured for:

providing a user interface for configuring a parameter of the clustering technique.

63. A non-transitory computer-readable medium that stores a set of instructions that is executable by at least one processor of an apparatus to cause the apparatus to perform a method, the method comprising:

receiving a first image and a second image associated with the first image, the first image comprising a first region, and the second image comprising a second region;

determining, using a clustering technique, a first descriptor representing features of a plurality of pixels in the first region, and M second descriptor representing features of a plurality of co-located pixels in the second region, wherein each of the plurality of pixels is co-located with one of the plurality of co-located pixels, and M is a positive integer;

determining frequencies of a plurality of mapping relationships, wherein each of the plurality of mapping relationships associates a first pixel of the plurality of pixels in the first region and a second pixel of the plurality of co-located pixels in the second region, the first pixel is associated with the first descriptor, the second pixel is associated with one of the M second descriptor, and the first pixel is co-located with the second pixel; and providing an output for determining whether there is existence of an abnormal pixel representing a candidate defect on the sample based on a determination that a frequency of a mapping relationship associated with the abnormal pixel does not exceed a frequency threshold.

64. The non-transitory computer-readable medium of clause 63, wherein the first image is an inspection image generated by an image inspection apparatus scanning the sample, the second image is a design layout image associated with the sample, and the abnormal pixel is in the first region.

65. The non-transitory computer-readable medium of clause 63, wherein the first image is a design layout image associated with the sample, the second image is an inspection image generated by an image inspection apparatus scanning the sample, and the abnormal pixel is in the second region.

66. The non-transitory computer-readable medium of any of clauses 64-65, wherein the design layout image is generated based on a file in a graphic database system format, a graphic database system II format, an open artwork system interchange standard format, or a Caltech intermediate format.

67. The non-transitory computer-readable medium of any of clauses 64-66, wherein the image inspection apparatus comprises a charged-particle beam tool or an optical beam tool.

68. The non-transitory computer-readable medium of any of clauses 63-67, wherein the clustering technique comprises a dictionary learning technique.

69. The non-transitory computer-readable medium of clause 68, wherein determining the first descriptor and the M second descriptor comprises:

determining data representing a first set of image features and the first descriptor by inputting the first region to the dictionary learning technique, wherein the first descriptor comprises data representing a linear combination of the first set of image features; and determining data representing a second set of image features and the M second descriptor by inputting the second region to the dictionary learning technique, wherein each of the M second descriptor comprises data representing a linear combination of the second set of image features.

70. The non-transitory computer-readable medium of any of clauses 63-69, wherein the method further comprises:

generating a visual representation for at least one of the frequencies of the plurality of mapping relationships, the first descriptor, or the M second descriptor, wherein the visual representation comprises at least one of a histogram representing the frequencies, a first two-dimensional map representing the frequencies at each of the plurality of pixels in the first region, a second two-dimensional map representing the frequencies at each of the plurality of co-located pixels in the second region, a third two-dimensional map representing overlay of the first region and the second two-dimensional map, or a fourth two-dimensional map representing overlay of the second region and the first two-dimensional map.

71. The non-transitory computer-readable medium of any of clauses 63-70, wherein the method further comprises:

aligning the first image and the second image before determining the first descriptor and the M second descriptor.

72. The non-transitory computer-readable medium of any of clauses 63-71, wherein the method further comprises:

providing a user interface for configuring a parameter of the clustering technique.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

It will be appreciated that the embodiments of the present disclosure are not limited to the exact construction that has been described above and illustrated in the accompanying drawings, and that various modifications and changes may be made without departing from the scope thereof.

The invention claimed is:

1. A method for detecting a defect on a sample, the method comprising:

receiving, by a controller including circuitry, a first image and a second image associated with the first image;

determining, using a clustering technique, N first feature descriptor(s) for L first pixel(s) in the first image and M second feature descriptor(s) for L second pixel(s) in the second image, wherein each of the L first pixel(s) is co-located with one of the L second pixel(s), and L, M, and N are positive integers;

determining K mapping probability between a first feature descriptor of the N first feature descriptor(s) and each of K second feature descriptor(s) of the M second feature descriptor(s), wherein K is a positive integer; and providing an output that indicates whether there is existence of an abnormal pixel representing a candidate defect on the sample based on a determination that one of the K mapping probabilities does not exceed a threshold value.

2. The method of claim 1, wherein each of the N first feature descriptor(s) represents a feature of a subset of the L first pixel(s), and each of the M second feature descriptor(s) represents a feature of a subset of the L second pixel(s).

3. The method of claim 2, wherein the abnormal pixel is in the subset of the L first pixel(s).

4. The method of claim 1, wherein the first image is an inspection image generated by an image inspection apparatus scanning the sample, the second image is a design layout image associated with the sample, and the abnormal pixel is in the first image.

5. The method of claim 1, wherein the first image is a design layout image associated with the sample, the second image is an inspection image generated by an image inspection apparatus scanning the sample, and the abnormal pixel is in the second image.

6. The method of claim 4, wherein the design layout image is generated based on a file in a graphic database system format, a graphic database system II format, an open artwork system interchange standard format, or a Caltech intermediate format.

7. The method of claim 4, wherein the image inspection apparatus comprises a charged-particle beam tool or an optical beam tool.

8. The method of claim 1, wherein the clustering technique comprises a dictionary learning technique.

9. The method of claim 8, wherein determining the K mapping probability comprises:

determining data representing a first set of image features and the N first feature descriptor(s) by inputting a first region of the first image to the dictionary learning technique, wherein each of the N first feature descriptor(s) comprises data representing a linear combination of the first set of image features;

determining data representing a second set of image features and the M second feature descriptor(s) by inputting a second region of the second image to the dictionary learning technique, wherein each of the M second feature descriptor(s) comprises data representing a linear combination of the second set of image features, and each pixel of the first region is co-located with one pixel of the second region; and determining the K mapping probability between the first feature descriptor and each of the K second feature descriptor(s).

10. The method of claim 1, further comprising:

generating a visual representation for at least one of the K mapping probability, the N first feature descriptor(s), or the M second feature descriptor(s), wherein the visual representation comprises at least one of a histogram representing the K mapping probability, a first two-dimensional map representing the K mapping probability at each of the L first pixel(s), a second two-dimensional map representing the K mapping probability at each of the L second pixel(s), a third two-dimensional map representing overlay of the L first pixel(s) and the second two-dimensional map, or a fourth two-dimensional map representing overlay of the L second pixel(s) and the first two-dimensional map.

11. The method of claim 1, wherein each of the K mapping probability represents a probability of mapping relationships between each pixel associated with the first feature descriptor and a pixel being co-located with the each pixel and being associated with one of the K second feature descriptor(s).

12. The method of claim 1, wherein L is greater than one, and M, N, and K are greater than or equal to one.

13. The method of claim 1, further comprising:

aligning the first image and the second image before determining the N first feature descriptor(s) and the M second feature descriptor(s).

14. The method of claim 1, further comprising:

providing a user interface for configuring a parameter of the clustering technique.

15. A system, comprising:

an image inspection apparatus configured to scan a sample and generate an inspection image of the sample; and a controller including circuitry, configured for:

receiving a first image and a second image associated with the first image;

determining, using a clustering technique, N first feature descriptor(s) for L first pixel(s) in the first image and M second feature descriptor(s) for L second pixel(s) in the second image, wherein each of the L first pixel(s) is co-located with one of the L second pixel(s), and L, M, and N are positive integers;

determining K mapping probability between a first feature descriptor of the N first feature descriptor(s) and each of K second feature descriptor(s) of the M second feature descriptor(s), wherein K is a positive integer; and providing an output that indicates whether there is existence of an abnormal pixel representing a candidate defect on the sample based on a determination that one of the K mapping probabilities does not exceed a threshold value.

16. The system of claim 15, wherein each of the N first feature descriptor(s) represents a feature of a subset of the L first pixel(s), and each of the M second feature descriptor(s) represents a feature of a subset of the L second pixel(s).

17. The system of claim 16, wherein the abnormal pixel is in the subset of the L first pixel(s).

18. The system of claim 15, wherein the first image is an inspection image generated by an image inspection apparatus scanning the sample, the second image is a design layout image associated with the sample, and the abnormal pixel is in the first image.

19. The system of claim 15, wherein the first image is a design layout image associated with the sample, the second image is an inspection image generated by an image inspection apparatus scanning the sample, and the abnormal pixel is in the second image.

20. A non-transitory computer-readable medium that stores a set of instructions that is executable by at least one processor of an apparatus to cause the apparatus to perform operations for detecting a defect on a sample, the operations comprising:

receiving a first image and a second image associated with the first image;

determining, using a clustering technique, N first feature descriptor(s) for L first pixel(s) in the first image and M second feature descriptor(s) for L second pixel(s) in the second image, wherein each of the L first pixel(s) is co-located with one of the Z second pixel(s), and L, M, and N are positive integers;

determining K mapping probability between a first feature descriptor of the N first feature descriptor(s) and each of K second feature descriptor(s) of the M second feature descriptor(s), wherein K is a positive integer; and providing an output that indicates whether there is existence of an abnormal pixel representing a candidate defect on the sample based on a determination that one of the K mapping probabilities does not exceed a threshold value.

* * * * *